United States Patent [19]

Harrison et al.

[11] Patent Number: 4,639,798
[45] Date of Patent: Jan. 27, 1987

[54] DISK DRIVE HAVING TWO INTERACTIVE ELECTROMECHANICAL CONTROL SUBSYSTEMS

[75] Inventors: Joel N. Harrison, Campbell; Vincent A. Condito, San Jose; Randolph H. Graham, Santa Clara; Brian J. Nixon; Richard C. Simonsen, both of Pleasanton, all of Calif.

[73] Assignee: Quantum Corporation, Milpitas, Calif.

[21] Appl. No.: 806,082

[22] Filed: Dec. 6, 1985

Related U.S. Application Data

[62] Division of Ser. No. 444,523, Nov. 26, 1982, abandoned.

[51] Int. Cl.[4] .............................................. G11B 19/28
[52] U.S. Cl. ......................................... 360/73; 360/77
[58] Field of Search ................................... 360/73, 77

[56] References Cited

U.S. PATENT DOCUMENTS 3,900,796  8/1975  Rose .................................. 324/161
4,146,910  3/1979  Oliver et al. ......................... 360/72
4,420,715 12/1983  Lecourtier et al. ................... 360/73
4,492,992  1/1985  Rooney et al. ....................... 360/73
4,524,399  6/1985  Jepsen ................................. 360/97
4,538,099  8/1985  Moon ................................. 318/678

Primary Examiner—George G. Stellar
Attorney, Agent, or Firm—David B. Harrison

[57] ABSTRACT

A disk drive storage device employs two control subsystems, one for transducer position digital control and the other to control and precisely regulate spindle motor angular velocity in accordance with a crystal reference and a speed correction made at least once each revolution. A single servo sector on a data surface provides prerecorded track centering information. Overall electromechanical operations during track following activities are synchronized by the crystal controlled disk spindle motor subsystem which locates the position in time and space of the servo sector and which also interrupts program execution of the transducer position digital control subsystem and causes it to execute a subroutine for track centerline position correction. Direct digital commutation of the brushless DC spindle motor by a programmed digital microprocessor is an aspect of the present invention.

10 Claims, 25 Drawing Figures

DISK DRIVE HAVING TWO INTERACTIVE ELECTROMECHANICAL CONTROL SUBSYSTEMS

This patent is a division of U.S. patent application Ser. No. 06/444,523, filed on Nov. 26, 1982, now abandoned.

BACKGROUND OF THE INVENTION

The present invention relates to rotating disk data storage devices. More particularly, the present invention relates to improvements in rotating disk data storage device technology enabling the construction and use of a very small, compact and inexpensive data storage device having vastly expanded storage capacity.

Small rotating rigid disk drives are known in the art. The assignee of the present invention pioneered the development of a high capacity, low cost eight inch rigid disk drive known in the trade as the Q2000 TM series of disk drives. Such drives have been very successful. Various facets thereof are set forth in the following U.S. patent applications commonly assigned with the present invention: RE 32,075 Ser. No. 06/190,198 filed Sept. 24, 1980 now U.S. Pat. No. 4,396,959; Ser. No. 06/304,209 filed Sept. 21, 1981 now U.S. Pat. Nos. 4,419,701, and 06/424,914 filed Sept. 27, 1982 now U.S. Pat. No. 4,516,177.

While the assignee's eight inch rigid disk drive product line has been very well received, a need has arisen for a 5¼ inch rigid disk drive product which combines the features of very high data storage capacity and very small physical packaging, reliability and low cost, features not readily apparent from the elements employed in the assignee's established eight inch rigid disk drive product line or in competitive products.

SUMMARY OF OBJECTS AND THE INVENTION

A general object of the present invention is to provide a small rotating rigid disk data storage device with a data storage capacity hitherto not achieved in comparably sized devices.

Another object of the present invention is to provide a fully digitally controlled transducer position servo system in a small rotating rigid disk data storage device.

Another object of the present invention is to provide a small rotating rigid disk data storage device with an optical encoder for sensing data track boundaries which utilizes digital automatic gain control of the light source to compensate for variations in photodetector characteristics.

Another object of the present invention is to provide a digital controller for a brushless, electronically commutated direct drive disk motor.

Yet another object of the present invention is to provide a plurality of digital processors for parallel digital processing and control of electronic commutation of a brushless direct drive disk motor, rotary actuator position control of the data transducers, and digital compensation of the track boundary optical encoder.

A further object of the present invention is to provide an improved and highly compact rotary actuator assembly which includes thermal isolation from the drive base casting.

One more object of the present invention is to provide an improved and simplified optical encoder assembly which is easily installed and aligned.

Yet another object of the present invention is to provide an improved base casting for the drive which accomodates and registers the electro-mechanical elements within an enclosed, airtight environment and which supports the electrical components and provides for their interconnection and heat dissipation in an improved arrangement.

A still further object of the present invention is to provide a disk drive which includes an improved rotary actuator arm.

One more object of the present invention is to provide a visual indication of relative track position of the data transducer through a window in the base casting cover.

One further object of the present invention is to provide a small, highly compact rotating disk data storage device which is easily assembled and adapted for robotic manufacture, and which achieves significantly greater storage capacities at lower costs than heretofore known.

These objects are achieved in a rotating disk data storage device connectable through an interface to a disk drive controller of a computing system. The device includes a base, a data storage disk, and at least one positionable data transducer for reading and writing data from and to a multiplicity of concentric data tracks on a storage surface of the disk during track following operations of the device. A single servo sector located in a gap between the end and the beginning of each user data track location is prerecorded with track centerline correction information.

The device includes a transducer position control subsystem including a moveable transducer carriage for supporting the transducer in moveable radial relation to the storage surface, an electromechanical actuator structure for moving the transducer from track to track during track seeking operations and for providing electrical detents for stabilizing the transducer within the boundaries of a selected data track during track following operations, and a transducer position digital controller programmed and connected to receive track selection information from the interface and to put out digital track selection values to the electromechanical actuator structure during track seeking operations, and programmed and connected to receive track centering information read by the data transducer and to put out track centerline correcting values to the electromechanical actuator structure in order to maintain the transducer in centerline alignment with the data track being followed, as an interrupt subroutine to all other of its control program activities during track following operations.

The device further includes a spindle motor subsystem having a plural phase brushless direct current spindle motor mounted to the base, having a rotating spindle on which the data storage disk is directly mounted for rotation, and having a plurality of stationary coils and a plurality of non-contacting commutation sensors. An electronic motor driver power switching circuit is connected to drive the coils thereby to cause the spindle to rotate. A spindle motor speed controller precisely controls spindle motor angular velocity in response to signals provided by said commutation sensors and by a crystal controlled spindle speed reference. The controller includes a speed correction circuit for determining and correcting spindle angular velocity to the crystal reference at least once for each rotation of the storage disk. A moving index marker on the spindle marks the location of beginning of the single servo sector prerecorded on the disk surface, and a raw index detector fixed relative to the base detects the proximity of the moving index marker and thereupon generates an electrical raw index signal for marking the time and spatial location of the single servo sector as the data storage disk rotates.

During track following operations of the data storage device, the operation of the spindle motor subsystem causes program execution of the transducer position controller to be interrupted in response to the motor subsystem raw index signal so that the position controller may thereupon call and execute its subroutine for processing the centerline correction information in order to cause the transducer to follow the centerline of the data track being followed. In this manner, the spindle motor subsystem interacts with and supervises operations of the transducer position subsystem during track following operations.

These objects, advantages and features of the present invention will be more fully understood and appreciated by considering a presently preferred embodiment hereof, presented in conjunction with the accompanying drawing.

DETAILED DESCRIPTION OF A PREFERRED EMBODIMENT

General Description

Figure 1:
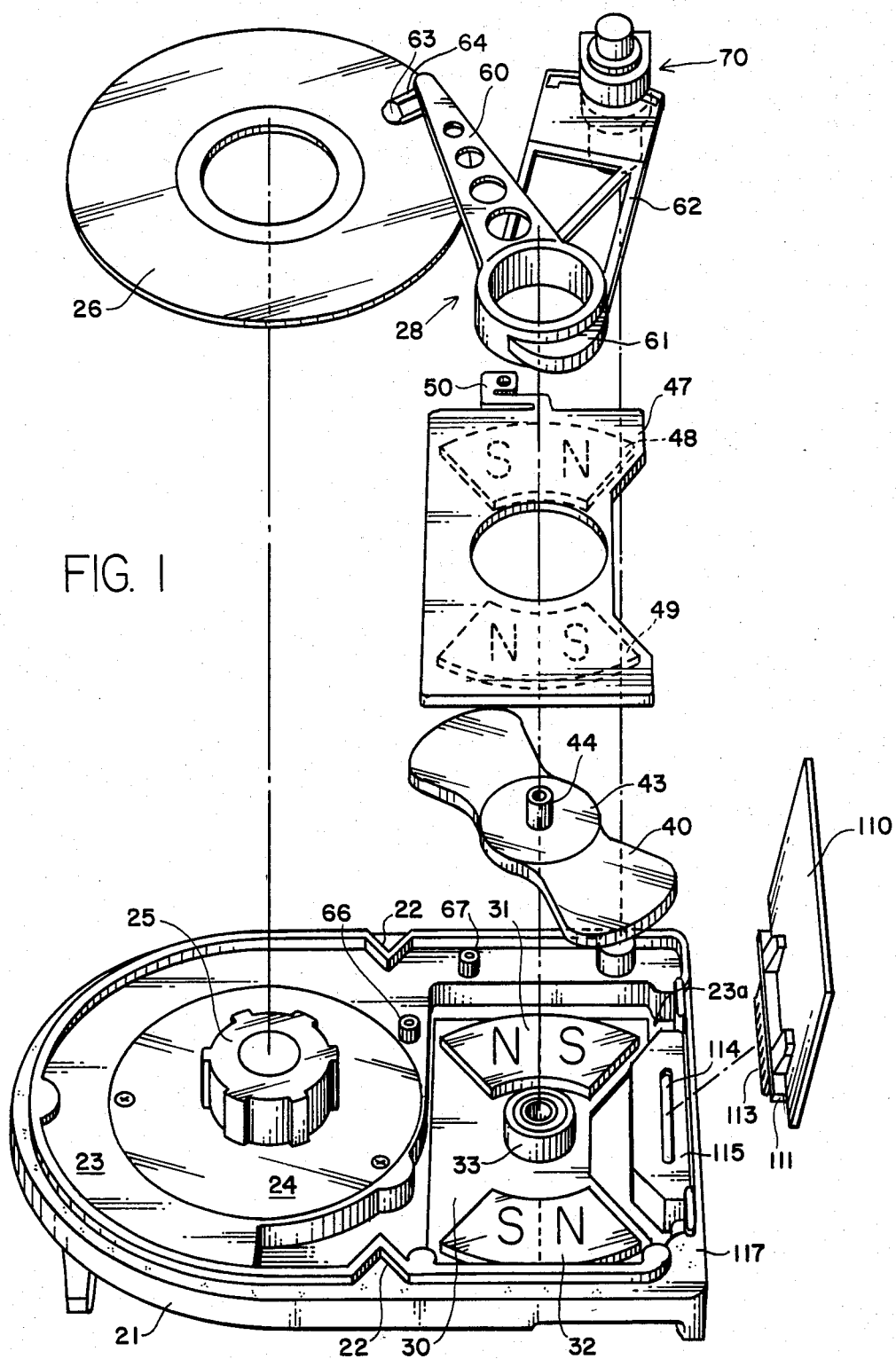
FIG. 1 is an exploded view in perspective of major mechanical and electrical components of a disk drive incorporating the principles of the present invention.
Figures 2, 4:
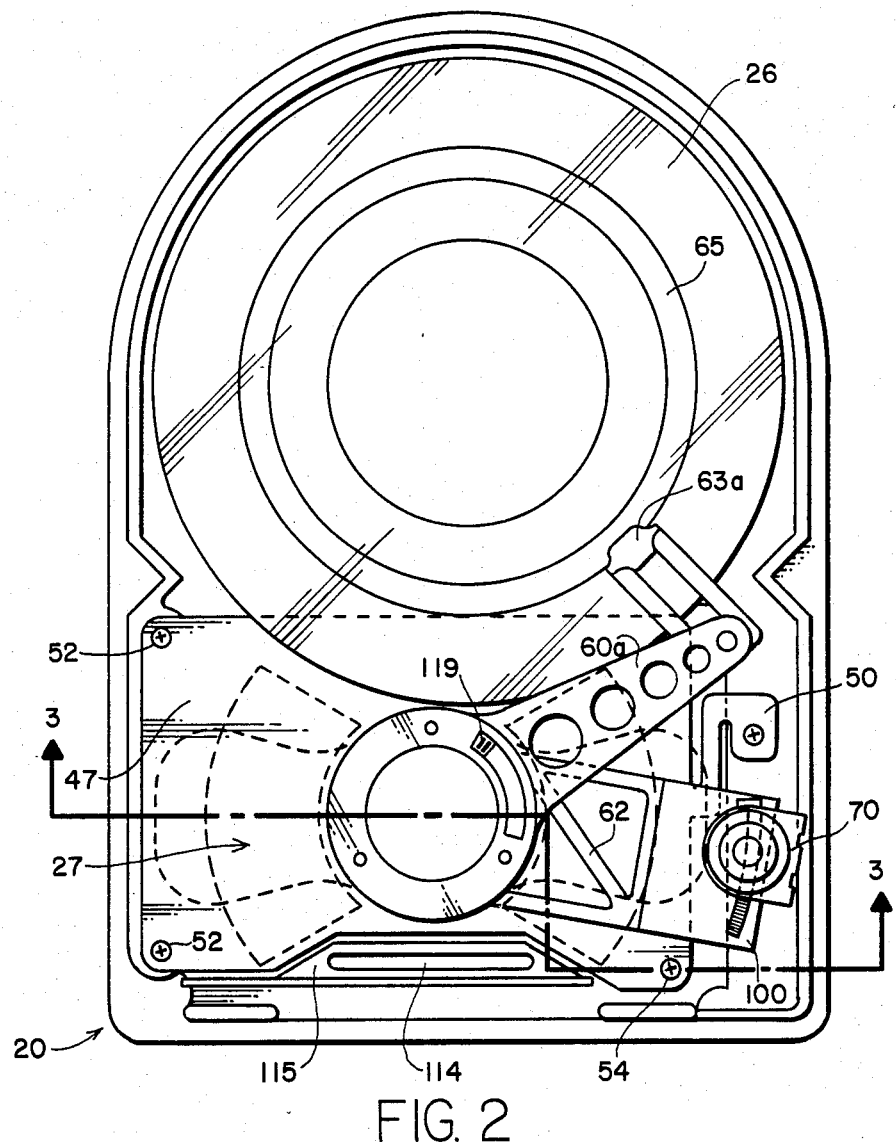
FIG. 2 is a top plan view of the same disk drive as shown in FIG. 1.
FIG. 4 is a top plan view of the "bow-tie" rotor of the rotary actuator used in the same disk drive.

A disk drive system 20, incorporating the principles of the present invention, is depicted structurally in FIGS. 1–5 and electrically in FIGS. 6–13. The structural components of the drive 20 will be described first, followed by a description of the electrical components and their interconnection and operation.

The disk drive 20 comprises an improved data storage system utilizing rigid rotating disk data storage media and data transducers flying in close proximity to the major surface data storage regions of the disks, sometimes referred to as Winchester technology. The drive 20 provides a very high data storage capacity up to approximately 40 million bytes with e.g. four 5¼ inch rigid data storage disks within in a small, compact size, e.g. 3.3 inches wide, by 5.9 inches high, by 8.5 inches deep, the same general dimensions of the standard 5.25 inch minifloppy disk data storage device, such as the Shugart Associates' SA 400 TM series floppy disk drives. While the present system 20 is intended to serve the so-called 5¼ inch rigid disk drive marketplace, the principles of the present invention apply with the same force to systems employing either larger or smaller storage disks and greater or fewer numbers of disks. While the present system 20 may be used with one storage disk, practical economies of cost-per-byte of storage capacity render the two, three and four disk versions of the system 20 most practical.

The present system 20 uses a periodically closed loop servo system including an optical encoder putting out two quadrature phase signals to provide track boundary information, and centerline offset servo sector bursts for track centerline information. The general servo principles employed by the system 20 are taught in the assignee's U.S. patent application Ser. No. 06/190,198 filed Sept. 24, 1980 now U.S. Pat. No. 4,396,959, reference to which is made for further information.

Structural Description

Referring now to FIGS. 1–5, the drive system 20 is formed upon a cast aluminum base 21 which registers and aligns all other electromechanical components. The base 21 is divided by two notches 22 into a semi-cylindrical disk region 23, and a rotary actuator well region 23a. The notches 22 are provided to facilitate robotic automatic handling and assembly of the system 20. The base 21 is shock mounted to user equipment by shock mounts (not shown) to provide necessary mechanical isolation to the system 20.

A three phase brushless (electronically commutated) direct current motor 24 is mounted in a central opening of the disk region 23 of the base 21. The motor 24 directly drives a disk hub 25 to which storage disks 26a, 26b, 26c, and 26d (FIG. 3) are mounted in a parallel, equally spaced apart arrangement. The motor 24 rotates the disks 26 at a constant e.g. counterclockwise angular velocity of e.g. 58 revolutions per second in order to accomodate a servo sector while maintaining a data storage capacity equal to drives not having the servo sector.

The rotary actuator well region 23a provides a generally rectangular recess for the components of a rotary actuator assembly 27 which rotates a data transducer carriage assembly 28. The components of the actuator assembly 27 include a steel magnetic field return base plate 30 to which two arcuate bar magnets 31 and 32 are glued. The magnets 31 and 32 are of a suitable ferroceramic and are magnetized with north-south poles in a sense normal to the plane of the plate 30, as indicated by the "N" and "S" (for north and south, respectively) labels in FIG. 3. The fields are inverted at the midway of each magnet, as indicated by the "N" and "S" labels in FIG. 1.

A cylindrical column 33 portion of the base casting 21 extends upwardly in the actuator well 23a. The column 33 has a cylindrical axial bore 34. Two bearing assemblies 35 and 36 are glued in the bore 34 in vertical axial alignment. They are separated from each other by a spacer 37, and a spring 38 urges them into proper alignment while the glue is setting.

The moving member of the actuator 27 is a rotor 40 in the general shape of a bow tie. The bow-tie rotor 40 includes two opposed trapezoidal field coils 41 and 42. Each coil is formed of e.g. 150 turns of 27 gauge insulated copper wire. The coils 41 and 42 are fully encapsulated in a suitable plastic resin molding compound which is selected for electrical insulation and thermal conduction. A metal hub 43 and shaft 44 are molded integrally with the coils 41 and 42 to form the rotor 40. A four conductor connector cable 45 provides an electrical path from the coils 41 and 42 to an external plug 46.

Figure 3:
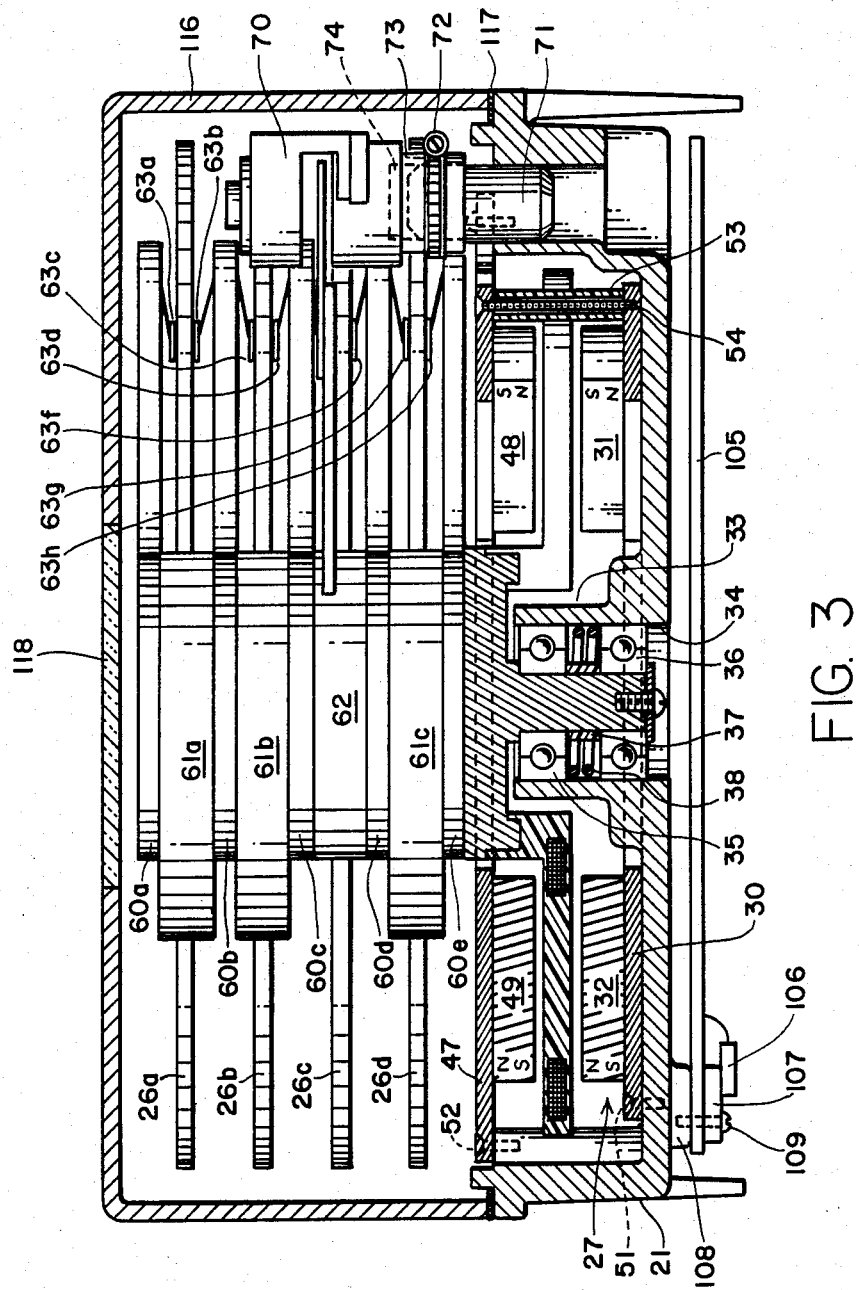
FIG. 3 is an end view in elevation and section of the same disk drive taken along line 3—3 in FIG. 2.

A top magnetic flux return plate 47 encloses the rotor 40 within the actuator assembly 27. The top plate 47 includes two arcuate bar magnets 48 and 49 having fields aligned as shown in FIGS. 1 and 3. The top bar magnets 48 and 49 are aligned to be directly over the lower magnets 31 and 32 respectively. The top plate 47 also includes a Zee portion 50 which provides for mechanical attachment to the base casting 21 while also providing thermal isolation to the top plate 47 and the bottom plate 30, as will be explained shortly.

The rotor 40 lies in a gap between the magnet pairs. Its shaft 44 extends through the bearings 35 and 36. A shoulder on the shaft 44 cooperates with a washer and screw to lock the rotor to the bearings to maintain precise alignment of the rotor relative to the magnets.

One aspect of the present invention is to provide uniform thermal isolation of the upper plate 47 and lower plate 30 relative to the base casting 21. The ferromagnetic plates 30 and 47 (made of low carbon steel) have a different coefficient of expansion than does the cast aluminum base.

To overcome the warp and distortion problems presented by differential thermal expansion of the plates relative to the base, the plates 30 and 47 have been anchored to the base 21 at one end, and to each other at the other, Zee portion 50 end. Thus, the bottom plate 30 is connected by two screws 51 to the base casting 21 and the top plate 47 is connected to the base casting 21 by two screws 52 at the same end as the bottom plate 30. The plates 30 and 47 are joined together at the other end by two spacers 53 and two long screws 54.

The plates are connected to the base casting 21 at the other end only by the Zee portion 50 which thereby accomodates thermal expansion differentials between the plates 30 and 47 and the base casting 21, without causing any structural stresses or changes in critical alignment within the rotary actuator assembly 27. A gap of approximately 20 thousandths of an inch exists between the lower plate 30 and the floor of the actuator well region 23 of the base casting 21. This gap is provided by providing a slight shoulder on the floor at the region of the screws 51. This gap ensures that thermal isolation will be achieved by the rotor assembly without concern for variations in base castings encountered in mass production. It also removes any necessity for machining of the actuator well region 23.

Five data transducer arms 60a, 60b, 60c, 60d, and 60e are mounted to the rotor hub 44 in vertical axial alignment with each other and within equally spaced apart parallel planes. The arms 60 are separated by three counterweights 61a, 61b, and 61c, and by a scale arm 62.

The counterweights 61 counterbalance the transducer assembly 28 so that pure torque is generated by the rotor 40 and so that the bearings 35 and 36 are evenly and uniformly loaded, thereby minimizing the tendency to develop flat spots and run out problems.

The arms 60 support and register eight flying-head read/write data transducers 63a, 63b, 63c, 63d, 63e, 63f, 63g and 63h (transducer 63e is not shown in FIG. 3, being obscured by the scale arm 62.) The read/write transducers 63 are urged toward their respective storage surfaces by beam springs 64. The force exerted by each spring 64 is overcome by the aerodynamic characteristic of each transducer 63, so that it flies over the disk surface, and only comes into actual contact with it at an inner landing zone 65. The carriage assembly 28 formed by the arms 60, counterweights 61 and scale arm 62, is normally biased toward the landing zone by a tension spring (not shown). An inner crash stop 66 limits the excursion of the carriage assembly toward the disk hub 25, and an outer crash stop 67 limits excursion away therefrom. The crash stops 66 and 67 comprise elastomeric bumpers which are contacted by the lowermost transducer support arm 60e.

An optical encoder assembly 70 is mounted to the base casting 21 by attachment to a cylindrical vertical post 71. A clamp 72 around a slotted cylindrical base portion 73 secures the encoder 70 to the post 71. The base portion 73 defines an interior cylindrical chamber which is deeper than the vertical post 71, leaving a vertical gap 74 to accomodate vertical alignment of the encoder. Rotational alignment of the encoder is accomplished by rotating the encoder 70 about the post 71 with the clamp 72 released.

In fabrication of the disk drive 20, the encoder 70 is assembled and then mounted to the post 71. The clamp 72 is then tightened, and the encoder 70 and post 71 assembly is then attached to the base casting 21, and the post 71 is glued in its seat in the base casting with the optical encoder 70 held in proper rotational alignment. Should realignment of the encoder 70 subsequently be required during final checkout or maintenance, such is easily accomplished by release of the clamp 72, readjustment of the encoder 70, and retightening of the clamp 72. Release of the clamp 72 is thus seen to facilitate both vertical and horizontal-rotational alignment of the encoder assembly 70.

The encoder assembly 70 is illustrated in detail in FIGS. 5a–5g. The assembly 70 comprises a top member 80 and a bottom member 81. The top member 80 houses a light emitting diode 82 and a lens 82a to focus and collimate the emitted energy photons toward the lower member 81.

Figure 5A:
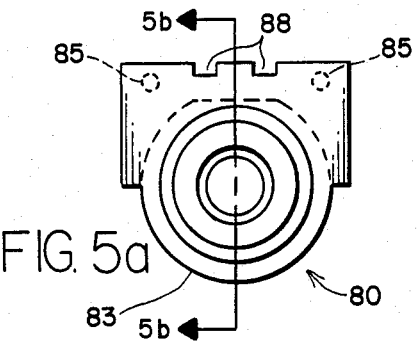
FIGS. 5a–5g are various views of components of the optical encoder assembly used in the same disk drive.
Figure 5B:
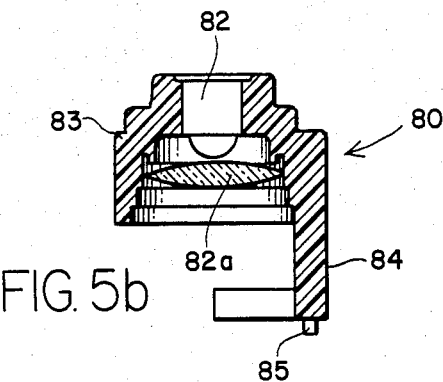

The top member 80, shown in FIGS. 5a and 5b, has a generally cylindrical body 83 and a back wall 84 which carries two pin-like protrusions 85 which mate with aligned recesses 86 in a back wall portion 87 of the bottom member 81. Two grooves 88 are formed in the back of the backwall 84 and the backwall 87. The grooves 88 contain and dress the electrical leads from the LED 82 down the backwalls 84 and 87.

The top member 80 and the bottom member 81 are formed of injection molded thermoplastic, and they are glued together with a suitable adhesive at the commonly contacting portions at and adjacent to the pins 85 and mating slots 86.

Figure 5C:
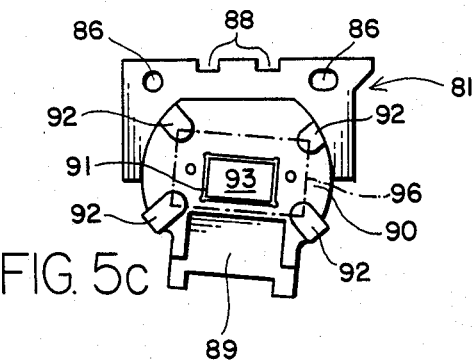
Figure 5D:
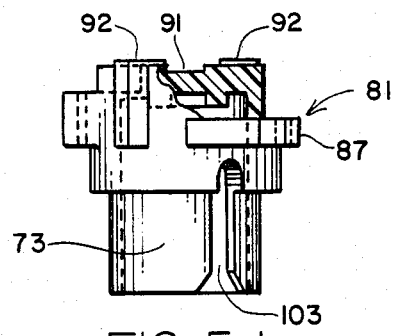

As shown in FIGS. 5c and 5d the bottom member 81 includes a lower shelf 89. It also has a somewhat rectangular shaped upper face 90 slightly above the shelf 89.

The face 90 includes a central rectangular recess 91 and four raised peripheral segments 92 generally located at the corners of the face 90.

Figure 5E:
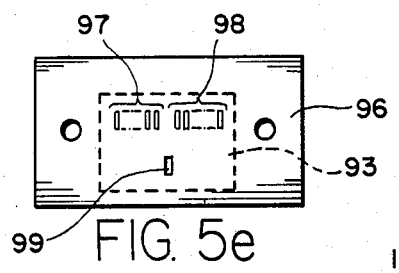
Figure 5F:
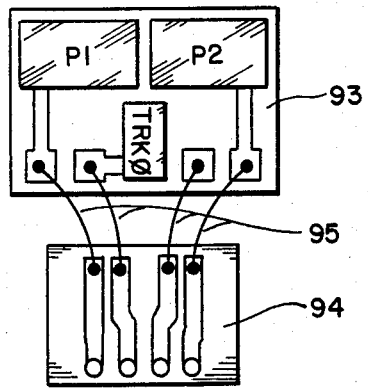
Figure 5G:
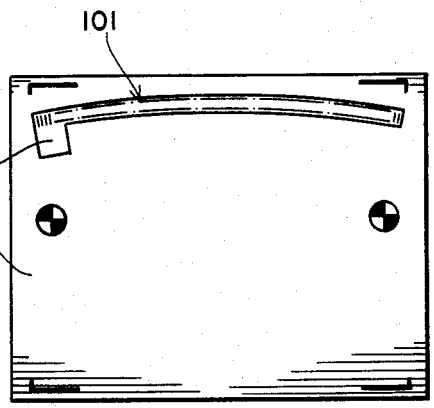

The recess 91 holds and aligns an integrated photodetector array 93, shown greatly enlarged in the top plan view of FIG. 5f. The array 93 includes three photodiodes, a P1 diode, a P2 diode and a TRK 0 diode. The P1 and P2 diodes are longitudinally adjacent to each other, and the smaller TRK 0 diode is inset and between the P1 and P2 diodes.

The lower shelf 89 formed in the lower member 81 holds a small, four-land printed circuit connector board 94. Fine wires 95 are bonded between connection pads on the array 93 and the lands of the printed circuit board 94. A four conductor cable (not shown) connects to the circuit board 94 to provide a structurally rugged electrical connection from the array 93. The array 93 and the printed circuit board 94 are glued to the recess 91 and the shelf 89, respectively, in the lower member 81.

A reticle (mask) 96 is mounted over the array 93 in alignment therewith by having its corners glued to the four raised segments 92 of the face 90. The reticle 96, shown greatly enlarged in FIG. 5e, is made of thin glass sheet with a silver opaquing film deposited thereon. There are three sets of openings in the film of the reticle 96: two sets 97 and 98 of e.g. 10 parallel openings corresponding in alignment to the P1 and P2 diodes, and a single opening 99 corresponding to the TRK 0 diode.

A scale 100 formed of thin glass sheet with silver radial microlines 101 deposited thereon is glued to the scale arm 62. The scale 100 is oriented so that it passes through a horizontal slot in the encoder 70 formed between the upper 80 and lower 81 members thereof so that its microlines 101 are in optical registration with the opening sets 97 and 98 of the reticle 96, except that the opening sets 97 are phase shifted by 90 degrees with the sets 98 so that the encoder 70 generates output signals in phase quadrature.

An opaque region 102 on the scale is aligned with the opening 99 for the TRK 0 diode. Light from the emitter diode 82 reaches the TRK 0 diode on the array 93 except when the scale 100 is at its left limit and the opaque region 102 blocks off the opening 99 thereby indicating that the transducers 63 have reached the radially outermost data track, referred to as "Track 0".

Slots 103 are formed in the cylindrical portion 73 of the lower member 81 to enable the encoder 70 to be clamped to the post 71 by the clamp 72, as already explained.

A main printed circuit board 105 is secured to the outside of the base casting 21, as shown in FIG. 3. The circuit board mounts and connects the electronic components described hereinafter, including the two microprocessors. Some components, such as monolithic power driver arrays 106, require effective thermal dissipation for proper operation. To accomodate effective heat transfer to the base casting, a local heat sink 107 is secured to a shoulder 108 of the base casting by screws 109 which engage threads in the shoulder 108.

A small printed circuit interconnect board 110 provides a series of connection pins (not shown) to which the head transducers 63, optical encoder 70 and the coils 41 and 42 of the bow-tie rotor 40 are connected by plugs, such as the plug 46. A small bracket 111 is secured to the board 110. The bracket 111 mounts to the base casting 21 by screws (not shown) so that connection lands 113 at the bottom of the board 110 pass through a slot 114 formed in the base casting 21. The lands 113 enter a connector mounted to the main printed circuit board 105 on the underside of the casting 21. The connector is seated in a space defined by an inset region 115 of the base casting 21. An elastomeric gasket (also not shown) between the bracket 111 and the base casting 21 provides an airtight seal at the slot 114.

A cast aluminum cover 116 encloses the upper portion of the disk system 20 so that the disks 26 and transducers 63 operate in a very clean (particle-free) environment. An elastomeric gasket 117 is placed between the cover 116 and an outer lip of the base casting 21 to provide for an airtight seal. A breather (not shown) enables air pressure within the enclosed space to equalize with the ambient environment. An air filter (not shown) removes contaminating particles from airflow generated by centrifugal forces from the rotating disks.

A clear plastic circular window 118 directly above the rotary actuator assembly permits visual inspection of disk rotation and actuator movement. A calibration mark on the window 118, together with a track scale 119 on the uppermost transducer arm 60a, provide a relative indication of data track position, so that track selection operations may be checked by the user.

Figure 6:
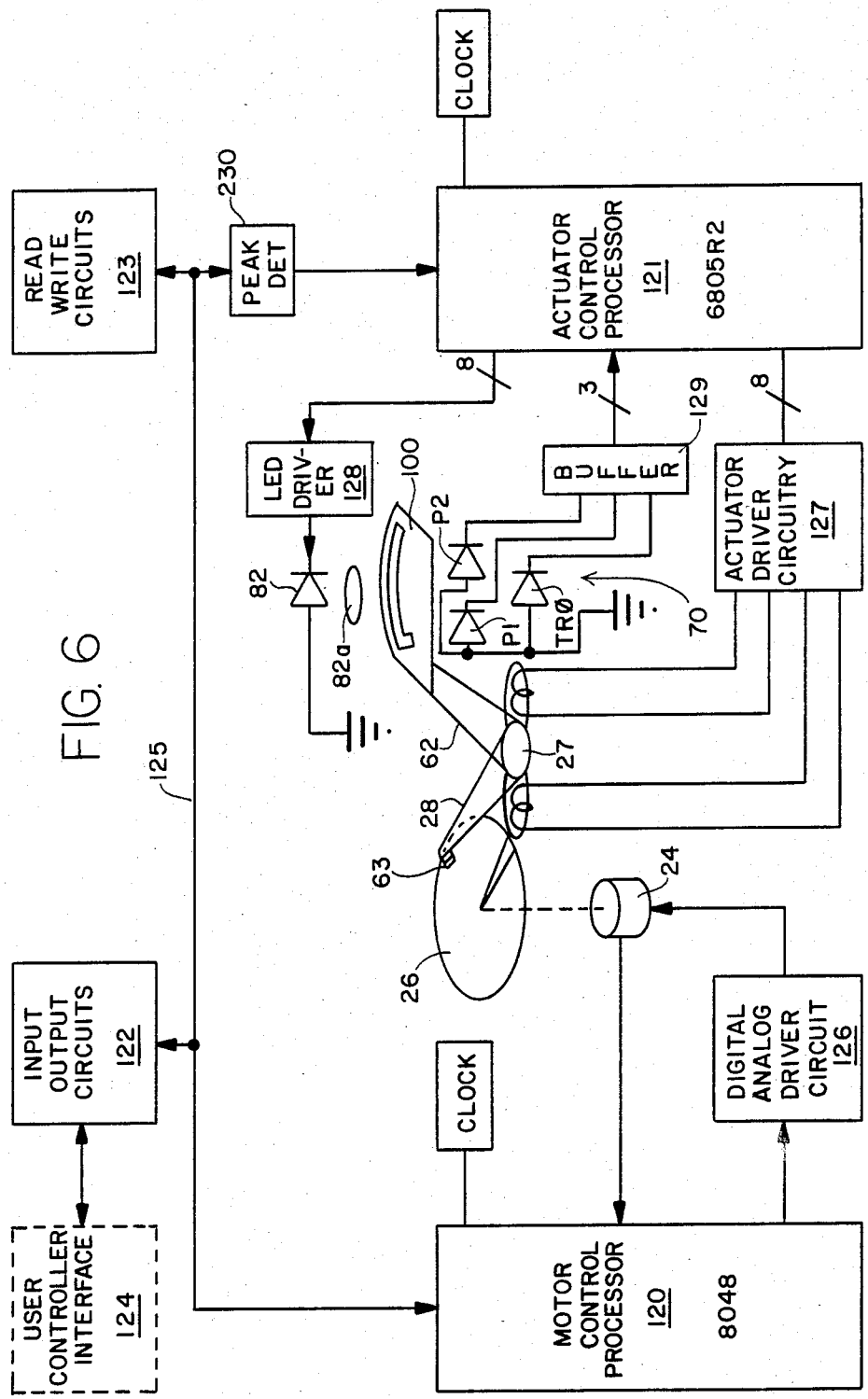
FIG. 6 is a simplified overall block diagram of the same disk drive.

Overview of Electrical Components (FIG. 6)

Referring now to FIG. 6, the system 20 has four interactive, interconnected electrical subsystems: motor control digital processor 120, actuator controller digital processor 121, interface circuitry 122, and read/write circuitry 123. These subsystems receive command information from the user interface 124, from the motor 24, optical encoder 70, and data transducer 63d via an interconnecting control bus 125, and calculate control data which digitally operates the motor 24 via a motor driver circuit 126, and the rotary actuator 27 via an actuator driver circuit 127 to move the carriage assembly 28 to move the transducers from track to track and to maintain the transducers within the boundaries of each selected data track. The optical encoder 70 is digitally trimmed and compensated by the processor 121 in conjunction with an LED driver circuit 128.

Figure 12:
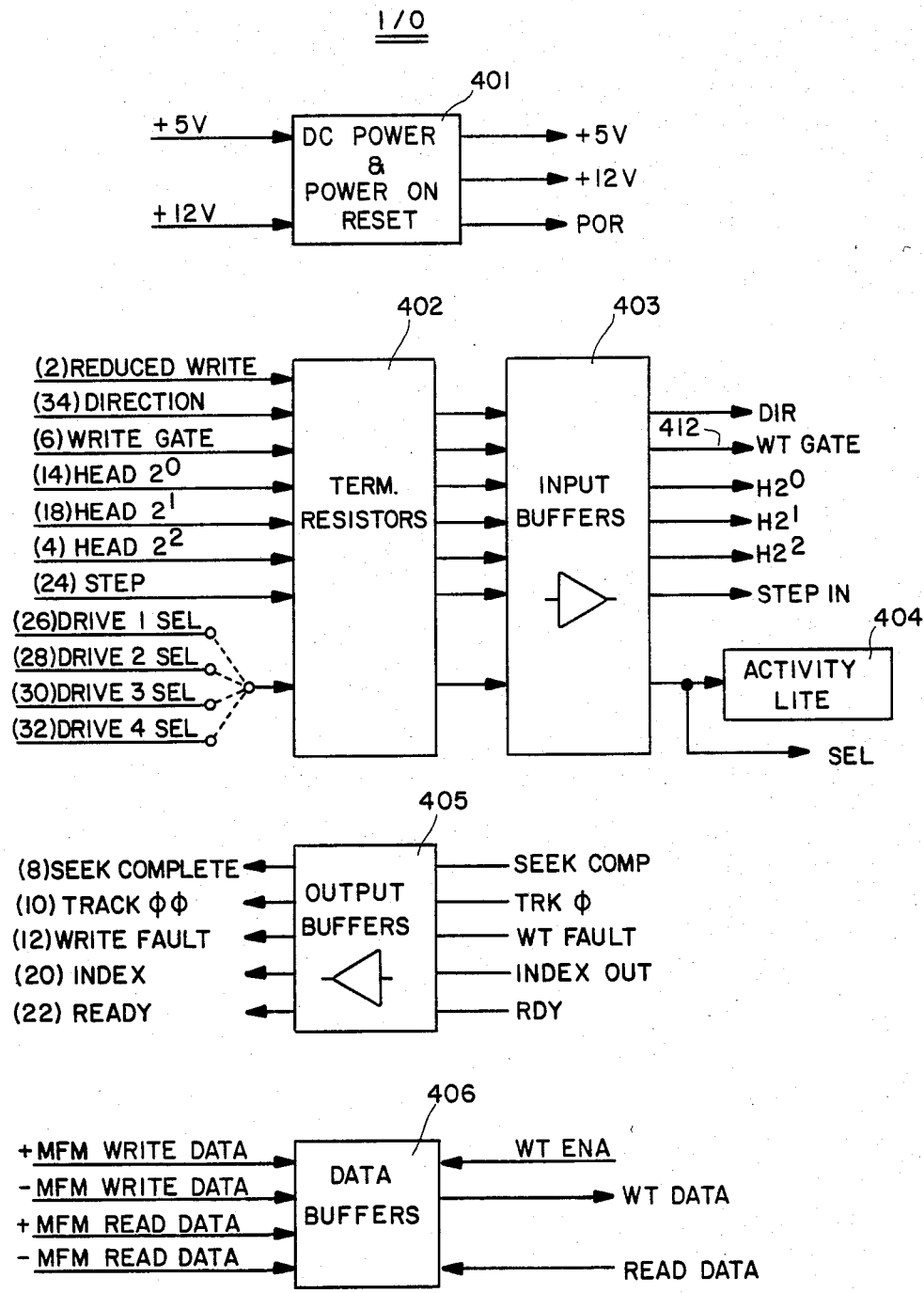
FIG. 12 is a detailed block diagram of the input-output circuitry used in the same disk drive.
Figure 13:
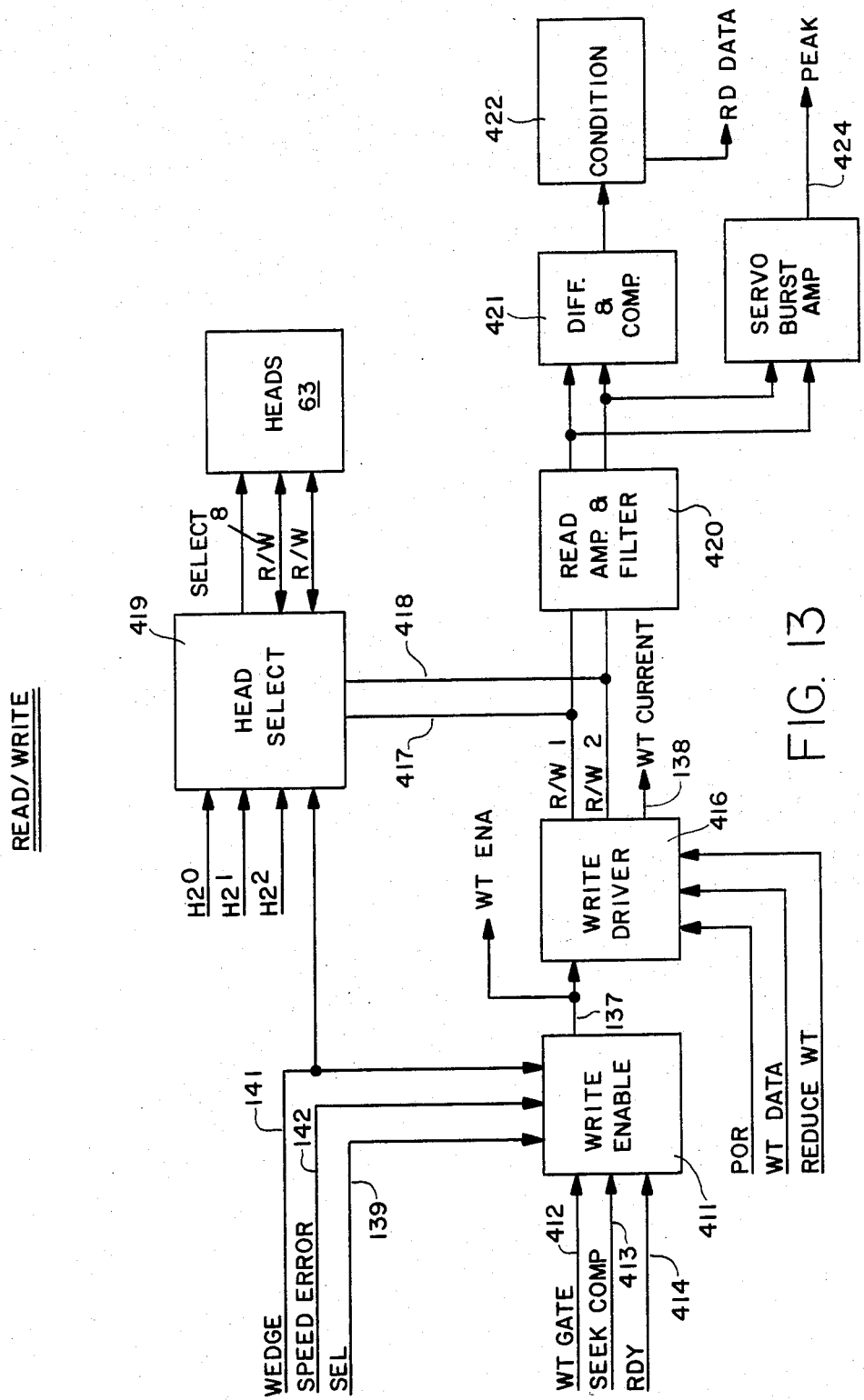
FIG. 13 is a detailed block diagram of the read-write circuitry used in the same disk drive.

The motor control digital processor 120 is described in connection with FIGS. 7 and 8; the actuator controller digital processor 121 is described in connection with FIGS. 9, 10 and 11; the interface circuitry 122 is described in connection with FIG. 12 and the read/write 123 circuitry is described in connection with FIG. 13. Each will now be described in turn.

Motor Control Digital Processor 120

Figure 7:
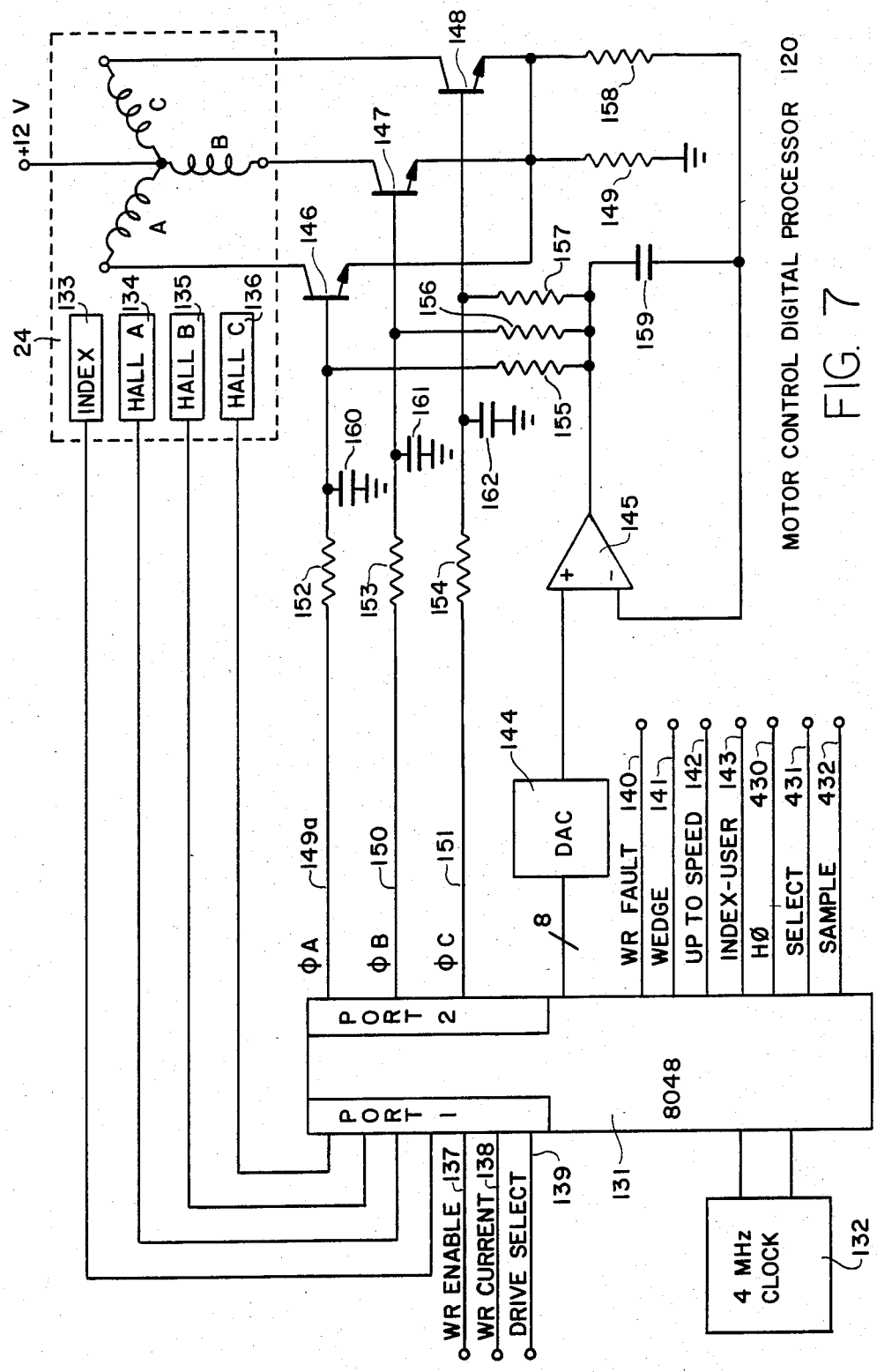
FIG. 7 is a detailed block and schematic diagram of the motor control digital processor and drive motor used in the same disk drive.

(FIGS. 7 and 8)

The motor control digital processor comprises a programmed digital microprocessor 131, preferably type 8048 manufactured by Intel Corporation, Santa Clara, Calif. The processor 131 includes an internal read only program memory which includes microcode written to carry out the flowchart steps depicted in FIG. 8 and described hereinafter. The processor 131 also includes internal storage registers and three eight bit parallel input/output data ports.

A crystal 132 connected to the processor 131 is used to generate four megahertz clock pulses to the processor 131. Seven single bit data inputs are provided to the processor 131 via one of the input/output ports, e.g. Port 1. Four bits are from sensors within the brushless dc motor 24: an electro-optical index sensor 133, and three Hall effect transducers 134, 135, 136. The Hall transducers provide phase information to the processor 131 to enable it to switch driving currents in the field windings of the motor 24 in order to achieve electronic commutation.

The Hall A, B, and C signals from the sensors 134, 135 and 136 correspond with the phases of the three-phase motor. For example, they may be 30 degrees apart, and as the drive hub 25 rotates each 30 degrees, a transducer will change data state. This change of state is read by the processor 131, and it calculates a switching matrix which appropriately drives the motor 24 over the next 30 degrees of rotation by putting out three phase binary drive signals Phi A, Phi B and Phi C at a second port, e.g Port 2.

The motor processor 131 also receives binary inputs from the interface circuitry 122 including a write enable signal via a line 137, a write current signal via a line 138, and a drive select signal via a line 139.

In addition to the Phi A–C signals, the processor 131 also puts out seven single bit control signals: a write fault signal via a line 140, a wedge control signal via a line 141, an up-to-speed signal via a line 142, a user index signal via a line 143, a H0 signal via a line 430, a select signal via a line 431 and a sample signal via a line 432.

The processor 131 also calculates and puts out an eight bit motor speed control data word to a digital to analog converter (DAC) 144 via e.g. Port 3. The DAC 144 converts the word to a voltage. The voltage is applied to the plus input of an operational amplifier 145, configured as a tranconductance amplifier.

The motor 24 includes three internal stationary field windings A, B, and C in a "Y" connection. The common node is connected to a power supply, e.g. plus 12 volts, DC. Three Darlington connected NPN power switches 146, 147 and 148 have their open collectors connected to windings A, B, and C, respectively. The switches may each be a type TIP 100 Darlington amplifier, made by Texas Instruments, or equivalent. While the switches 146, 147 and 148 are depicted in FIG. 7 as single transistors for simplicity, it is to be understood that in practice, Darlington connected power amplifiers are preferred because of the required amplification factor. The emitters of the Darlington switches 146, 147 and 148 are commonly connected through a reference sense resistor 149 to ground, to complete the electrical path for the windings A, B and C of the motor 24.

The processor 131 puts out the three phase commutation signals Phi A, Phi B and Phi C via three lines 149a, 150 and 151 which are respectively connected to the bases of the Darlington switches 146, 147 and 148 through three series resistors 152, 153 and 154.

Three resistors 155, 156 and 157 are commonly connected to the output of the amplifier 145. These three resistors are respectively connected to the bases of the Darlington switches 146, 147 and 148. The actual current passing through the windings A, B and C is modulated by the current at the bases of the three control Darlington switches 146, 147 and 148 and the state of the commutation signals Phi A, Phi B and Phi C. These three control currents in turn are determined by currents passing through the three series resistor networks formed of resistors 152 and 155, 153 and 156, and 154 and 157, respectively.

The minus input to the amplifier 145 is connected to the sense resistor 149/common emitter node via a resistor 158. Actual motor voltage at the sense resistor 149 is thus applied to the operational amplifier 145. The speed correction voltage from the DAC 144 (which is calculated digitally by the processor 131) is also applied to the amplifier 145. Correctional current flows at the output of the amplifier 145 whenever the actual motor voltage and the correction voltage do not correspond. This current either adds to, or subtracts from the current provided to the bases of the Darlington switches 146, 147 and 148, depending on whether the motor is rotating too fast or too slow. In this way, the modulation of drive current by digital processing in the processor 131 provides an improved motor speed control in a brushless DC motor.

A feedback capacitor 159 configures the amplifier 145 as an integrator in order to stabilize the motor speed control servo loop. Also, three bypass capacitors 160, 161, and 162 connected to the bases of the Darlington switches 146, 147 and 148 effectively slow down the switching speeds thereof and further stabilize motor control and reduce generation of unwanted noise otherwise arising from sharp switching transients.

Figure 8A:
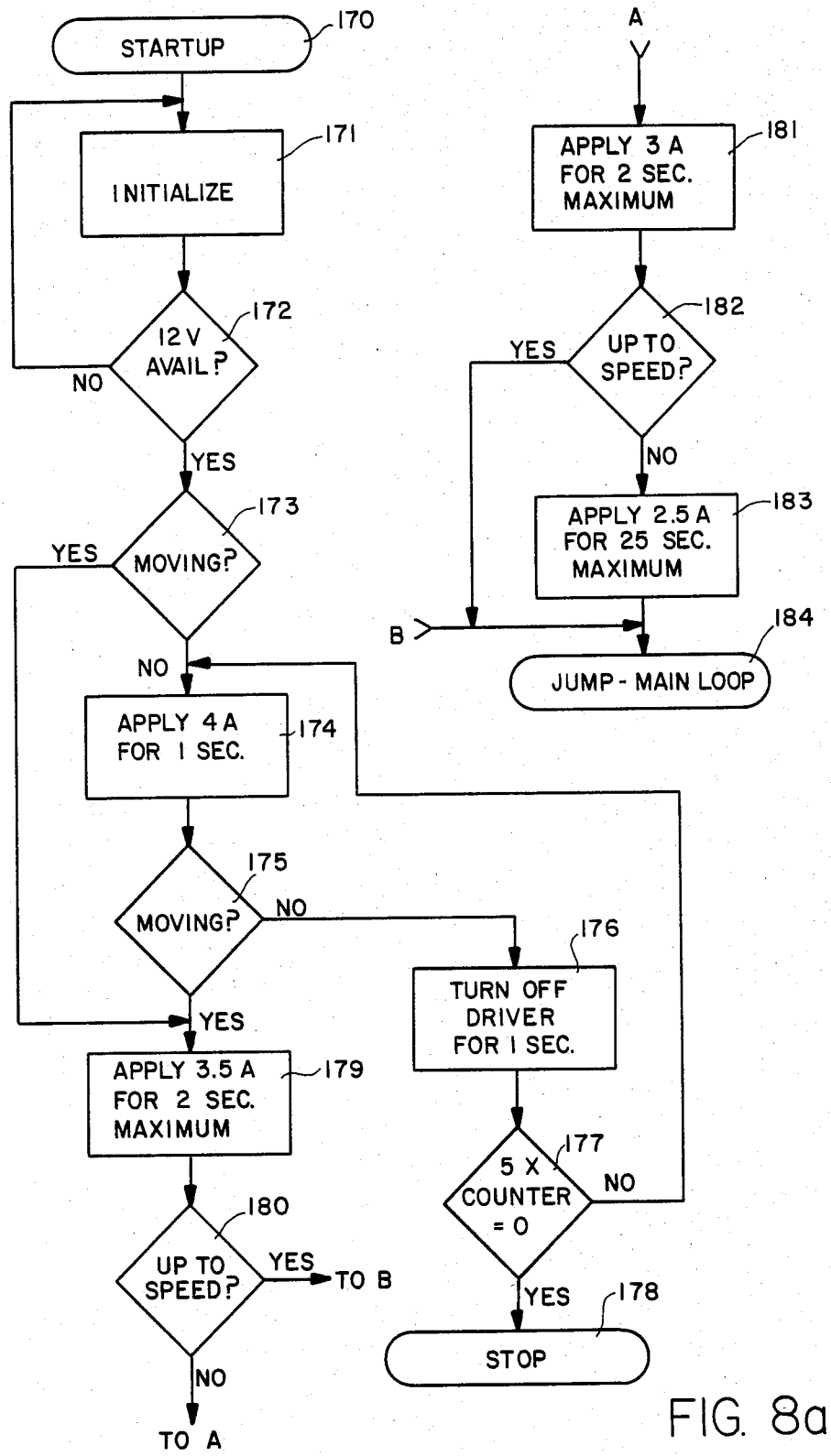
FIGS. 8a–8c are flowchart diagrams of the logical steps followed by the motor control digital processor depicted in FIG. 7.
Figure 8B:
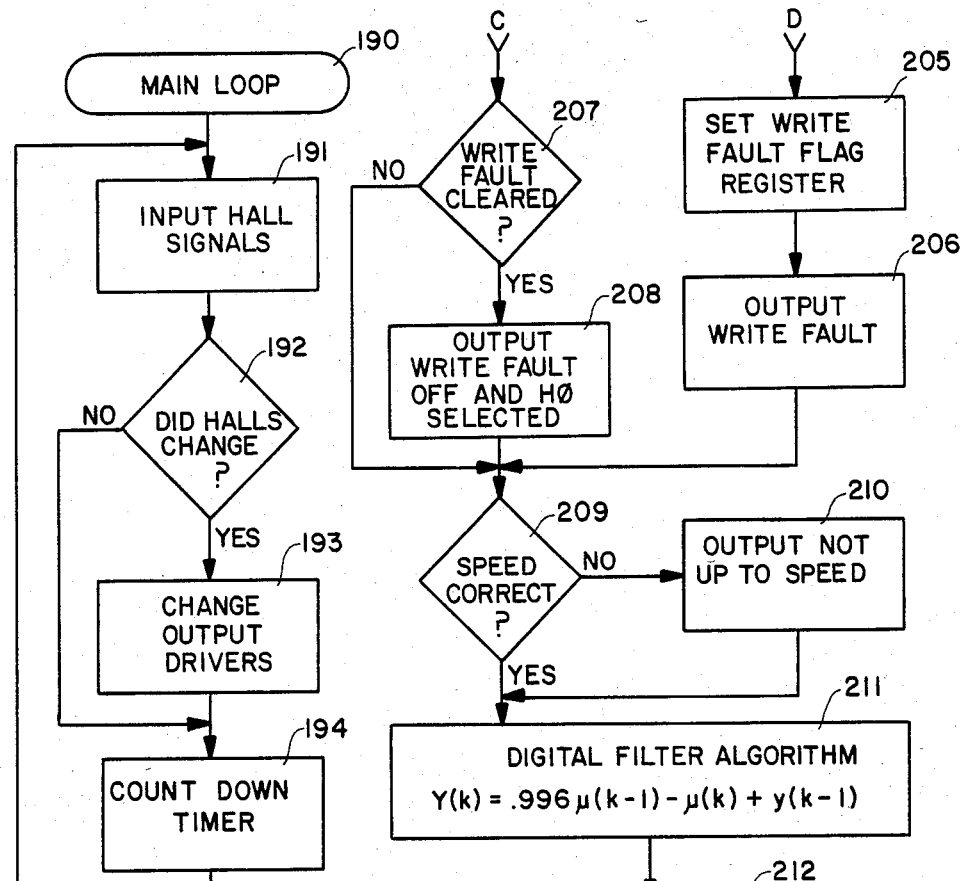
Figure 8C:
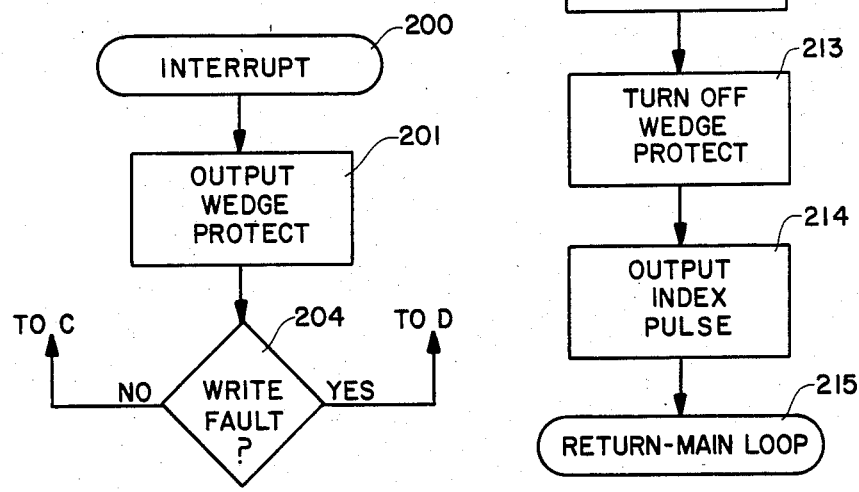

Motor Processor Control Program (FIGS. 8a, 8b and 8c)

The operation of the digital motor speed processor 120 is further understood by considering the flowchart diagrams of FIGS. 8a 8b and 8c. The first routine is startup 170. The processor 131 clears all of its registers at an initialize step 171. Then it tests for the availability of 12 volts DC at the power supply at a logical node 172. If 12 volts is unavailable, the startup routine loops back to initialize 171 and continues to loop until the correct voltage is available at the power supply.

When 12 volts is present, the startup routine advances to a logical node 173 which determines from the Hall sensors 134, 135 and 136 whether the motor 24 is rotating. If it is not rotating, the routine advances to a step 174 which applies high current, e.g. 4 amps to the motor 24 for e.g. 1 second. Another logical node 175 tests rotation of the motor 24. If it is still not moving, drive current is turned off for one second and a counter in the processor 131 is incremented at a step 176. A logical node 177 determines whether the counter has counted down to zero from a preset number such as 5. If it has not, the routine returns to step 174 and the steps 174, 175, 176 and 177 are repeated for five trys. If the motor is still not rotating after five trys, then the logical node 177 advances to a stop step 178 which shuts down the device 20 and informs the host interface of malfunction.

If the motor 24 is determined to be rotating at either of the steps 173 or 175, the startup routine advances to a step 179 which applies e.g. 3.5 amps for a two second interval to accelerate the rotation up to operating angular velocity in a reasonably short period of time. Whether the motor 24 is up to speed is tested at a logical node 180. If it is not, the routine applies 3 amps for a two second interval at a step 181 and tests for motor speed at a logical node 182. If the motor 24 is still not up to operating speed, the routine applies 2.5 amps for a 25 second interval (maximum) at a step 183 and then jumps to the main routine at a jump step 184. In the event that the motor was up to speed as tested at the node 180, the routine jumps directly to the jump step 184. This completes the startup routine 170.

The main loop 190 is depicted in FIG. 8b. The first step is to read the Hall A, B and C signals from the transducers 134, 135 and 136 and store the read values in an internal register of the processor 131 at a step 191. A logical node 192 compares the presently read values with the stored values to determine whether the Hall signals have changed. If they have, the processor 131 changes the matrix state of the Phi A, B and C output signals which are controlling the Darlington switches 146, 147 and 148 at a process step 193.

The motor processor 131 also then monitors the state of input lines including write current, write enable and drive select in order to determine if a write fault condition exists. This test sets the state of the output write fault line and is explained in more detail hereinafter.

If the Hall signals have not changed at the test 192, and following the step 193, the processor 131 enters a predetermined wait interval by counting a time interval at a step 194 and then loops back to the first step 191 of the main loop. The processor 131 remains in the main loop until interrupted by the index signal from the index sensor 133. Thereupon, the processor jumps to the interrupt routine 200.

The interrupt routine 200 is set out in FIG. 8c. First, the processor puts out a wedge protect signal via the output line 141 at a step 201. This step interrupts the actuator control processor 121, and it also inhibits any write operations at the read/write circuitry 122 in order to be sure that the servo sector is not overwritten.

The processor 131 performs a check on the data writing function at a node 204 by exclusive-OR testing the write enable line 137 and the write current line 138. The write enable line 137 is from the user interface via the input/output circuitry 122 and the write current line 138 is from the write amplifier in the read/write circuitry 123. Both lines should be simultaneously enabled or disabled (logical high or low). If they aren't, a fault condition exists, and a write fault flag is set in a register at a step 205 and put out on the line 140 at a routine step 206. If there is no write fault as determined at the node 204, the interrupt routine advances to a logical node 207 which tests whether the write fault flag register is cleared. If it is, the processor puts out an H0 signal at a step 208.

The interrupt routine then advances to a speed check node 209. If the motor 21 is not up to speed as checked at step 209, the processor 131 sends a not up to speed flag via the line 142 at a step 210.

The routine then advances to a process step 211 which calculates a digital filter algorithm:

$$Y(k) = 0.996mu(k-1) - mu(k) + y(k-1)$$

wherein Y(k) is the digital motor speed correction value put out to the DAC 144, mu(k−1) is the previous error signal, mu(k) is the present error signal and y(k−1) is the previous motor speed correction value put out. This algorithm puts out a pole and zero combination which maintains desired loop speed with appropriate damping. The calculated value is then put out at a step 212.

The interrupt routine then disables wedge protect by changing logical state of the line 141 at a step 213, and puts out a user index signal via the line 143 at a step 214. The interrupt routine then returns to the main loop at a step 215.

Actuator Control Digital Processor 121

Figure 9:
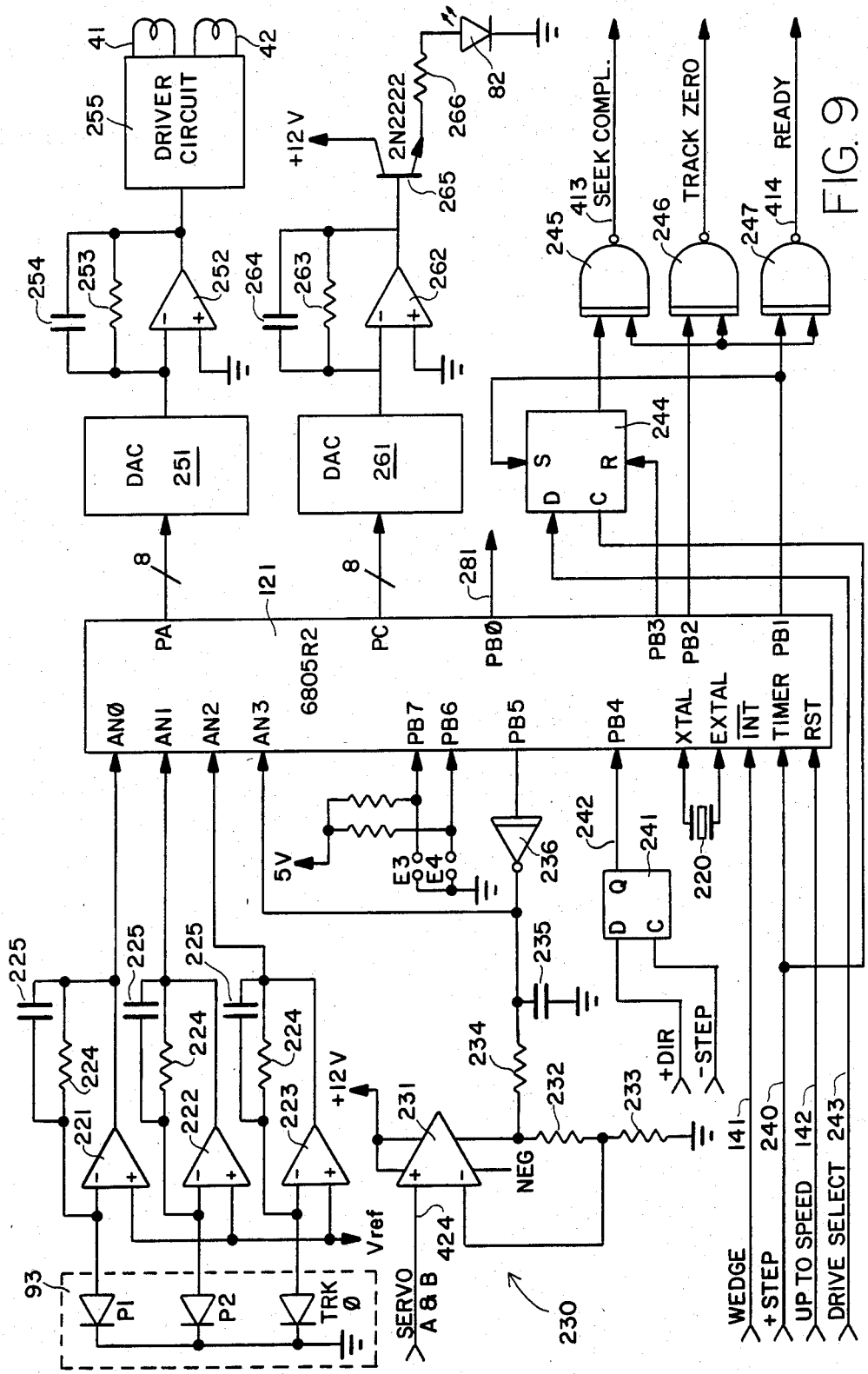
FIG. 9 is a detailed block diagram of the actuator controller digital processor used in the same disk drive.
Figure 10:
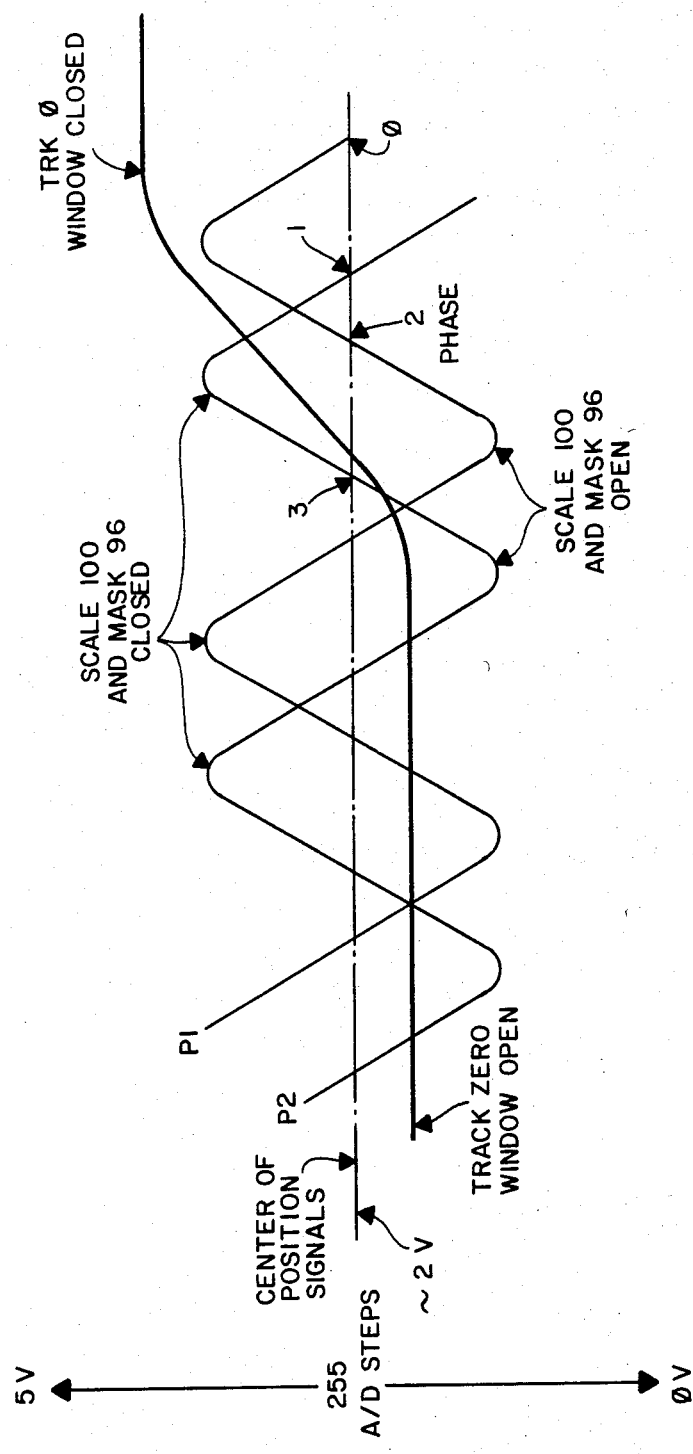
FIG. 10 is a waveform diagram of signals put out by the optical encoder.

(FIGS. 9, 10 and 11)

A more detailed illustration of the circuitry of the actuator control digital processor 121 is set forth in the FIG. 9 circuit diagram, the FIG. 10 waveform diagram and in the FIG. 11 control routine flowcharts.

While theoretically possible to use the 4 MHz clock of the motor control processor 120, it has been determined that the 6805R2 microprocessor operates most reliably with its own crystal 220 which sets the clock frequency to four megahertz (4 MHz).

The P1, P2 and TRK 0 diodes of the photocell array 93 are connected to three operational amplifiers 221, 222, and 223. Three equal value resistors 224 are connected from output to inverting inputs of the op amps 221, 222, and 223 to establish a very high gain factor for each. Three capacitors 225 bridge the resistors 224 to stabilize and compensate the op amps. The amplifiers 221, 222, and 223, the resistors 224 and the capacitors 225 are preferably mounted on the interconnect circuit board 110. The outputs of the op amps are connected through the circuit board lands 113 to circuit traces on the main pcb 115 leading to three multiplexed analog inputs AN0–AN2 of the microprocessor 121. Those inputs are connectable seqentially to the internal analog-to-digital converter within the processor 121.

Another analog input to the processor 121 on analog input AN3 comes from the read-write circuitry 123 via a line 424 which supplies the sequential A and B servo sector bursts read from the servo sector once each revolution. The A and B bursts are sine waves whose respective amplitude peaks are compared by the processor 121 in order to determine centerline offset and calculate a correction value.

The A and B bursts are first processed by a peak detector circuit 230 comprising a comparator 231 connected as shown. Two resistors 232 and 233 form a voltage divider network which provides a reference voltage to the comparator 231. A resistor 234, in series with a capacitor 235 forms a charging network. The capacitor 235 is charged to the peak of each burst A and B. An open collector NAND gate 236 is connected from a binary data port of the processor 121 to the capacitor 235 so that the processor 121 may discharge the capacitor 235 before it charges to each peak of an A or B servo burst.

Other data inputs to the actuator control processor 121 include a Wedge pulse sent from the motor control processor 120 on the line 141 to signal the beginning of the servo sector to the actuator processor 121. Another input is the up-to-speed control signal from the motor processor 120 via the line 142 which is connected to the reset input of the actuator processor 121. In the event that the up-to-speed signal becomes false, the actuator processor 121 is reset and begins a Reset routine 301, described hereinafter.

Stepping pulses from the user interface 124 come into the processor 121 via a line 240. Direction of the stepping pulses is determined by a D flip-flop 241 which latches the sign of the direction with the first stepping pulse received and sends that sign to the processor via a line 242. A drive select signal from the interface comes in on a line 243 to enable a seek complete D flip-flop 244 which is clocked by the stepping pulses and which is reset by the processor 121. The drive select signal also enables three open collector NAND gates 245, 246 and 247. The gate 245 sends a seek complete signal to the user interface when drive select is true and the latch 244 is set. The gate 246 is true whenever the transducers are located at track zero, as determined by the optical encoder 70. The gate 247 provides a "ready" signal to the user interface whenever drive select is true and the processor 121 has not detected an error. The "ready" signal merely indicates that the drive system 20 is ready to receive a track seek or read/write command from the interface.

The processor 121 puts out data words to the actuator driver circuitry 127 and to the LED driver circuitry 128. The actuator driver circuitry 127 includes an eight bit digital to analog converter 251 which puts out a current between zero and a reference current in 256 steps ($2^8$ steps). The current is converted to a voltage in an operational amplifier 252, the gain thereof being established by a resistor 253 and the stability thereof by a capacitor 254. The voltage is then provided to an analog driver circuit 255 for the rotor coils 41 and 42. One suitable driver circuit is depicted in FIG. 6 and discussed in connection therewith in a U.S. patent application Ser. No. 06/424,914, filed Sept. 27, 1982, now U.S. Pat. No. 4,516,177; also see commonly owned U.S. Pat. No. 4,538,099 which relates directly to the preferred amplifier circuit and owned by the assignee of the present application. A characteristic of the referenced driver circuit is that it passes no current through the rotor coils when the transducers are aligned with the centerline of a selected track. This reduces greatly the requirement for heat dissipation in the rotary actuator 27.

The LED driver circuit 128 comprises an eight bit digital to analog converter 261 which sets a current between zero and and a reference current in equal steps between 1 and 256. The set current is provided to an operational amplifier 262 located preferably on the interface circuit board 110. A resistor 263 and a capacitor 264 set the gain and provide the compensation for the amplifier 262. The current is amplified by a driver transistor 265 which is connected to drive the LED 82 through a current limiting resistor 266. Automatic gain control of the encoder 70 is described in connection with FIG. 10.

Two jumper pin sets 271 and 272 provide test jumper connection points E3 and E4 for two diagnostic routines called by the control program (discussed hereinafter).

The processor 121 puts out a reduce write current command via a line 281 to the read and write circuitry 123. Write current is reduced for the inside half of the data cylinders (tracks 256–511).

Actuator Control Program
(FIGS. 11a–11f)

Operation of the actuator controller digital processor 121 will be further understood by consideration of the flowcharts set forth in FIGS. 11a–11f. There are six separate routines in the control program for the actuator processor 121. These routines are Reset 301, Main Loop 302, Test 303, Seek 304, Wedge 305, and Step Pulse 306.

Figures 11A, 11B:
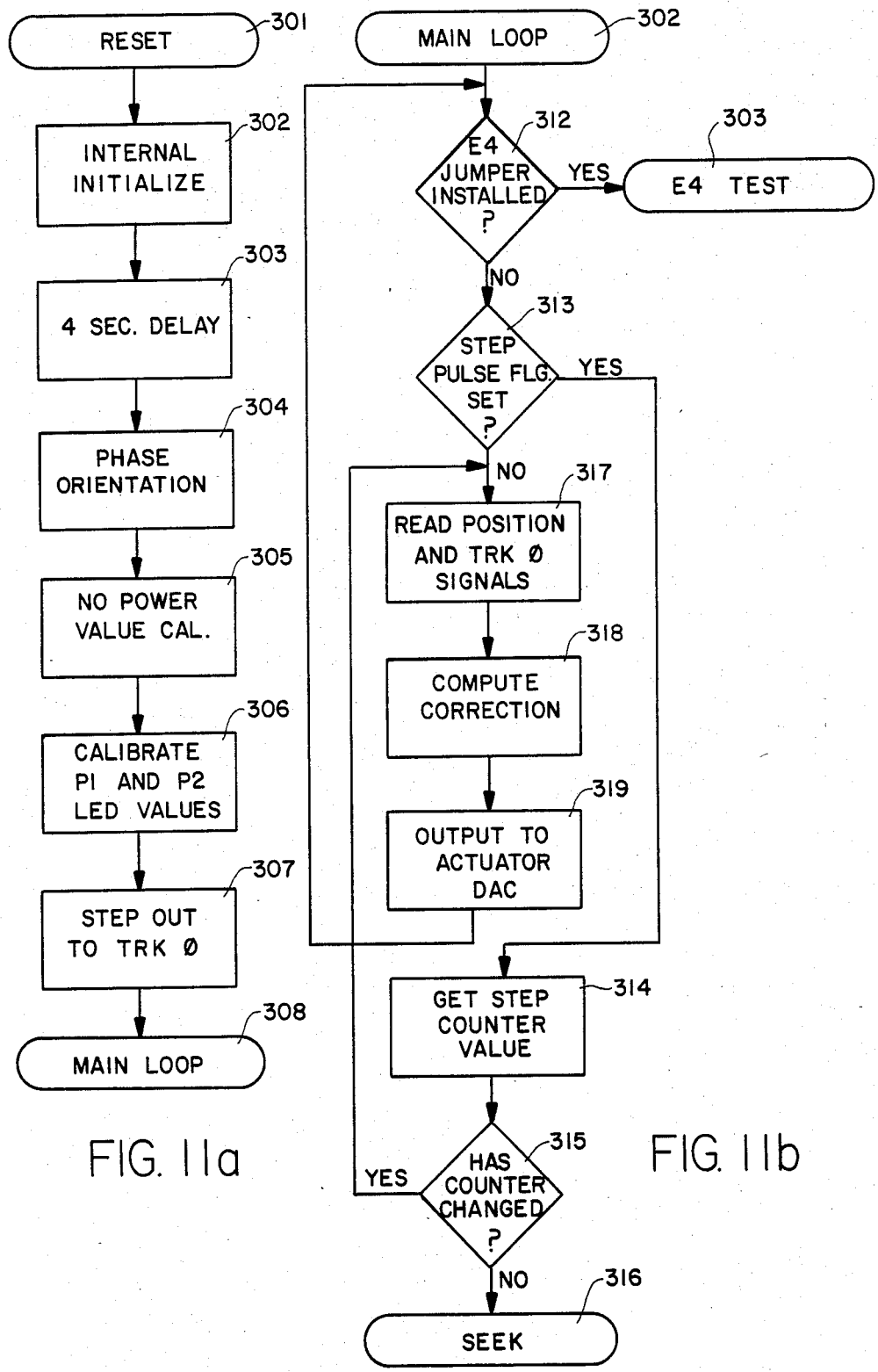
FIGS. 11a–11f are flowchart diagrams of the logical steps followed by the actuator controller digital processor depicted in FIG. 9.
Figures 11C, 11D:
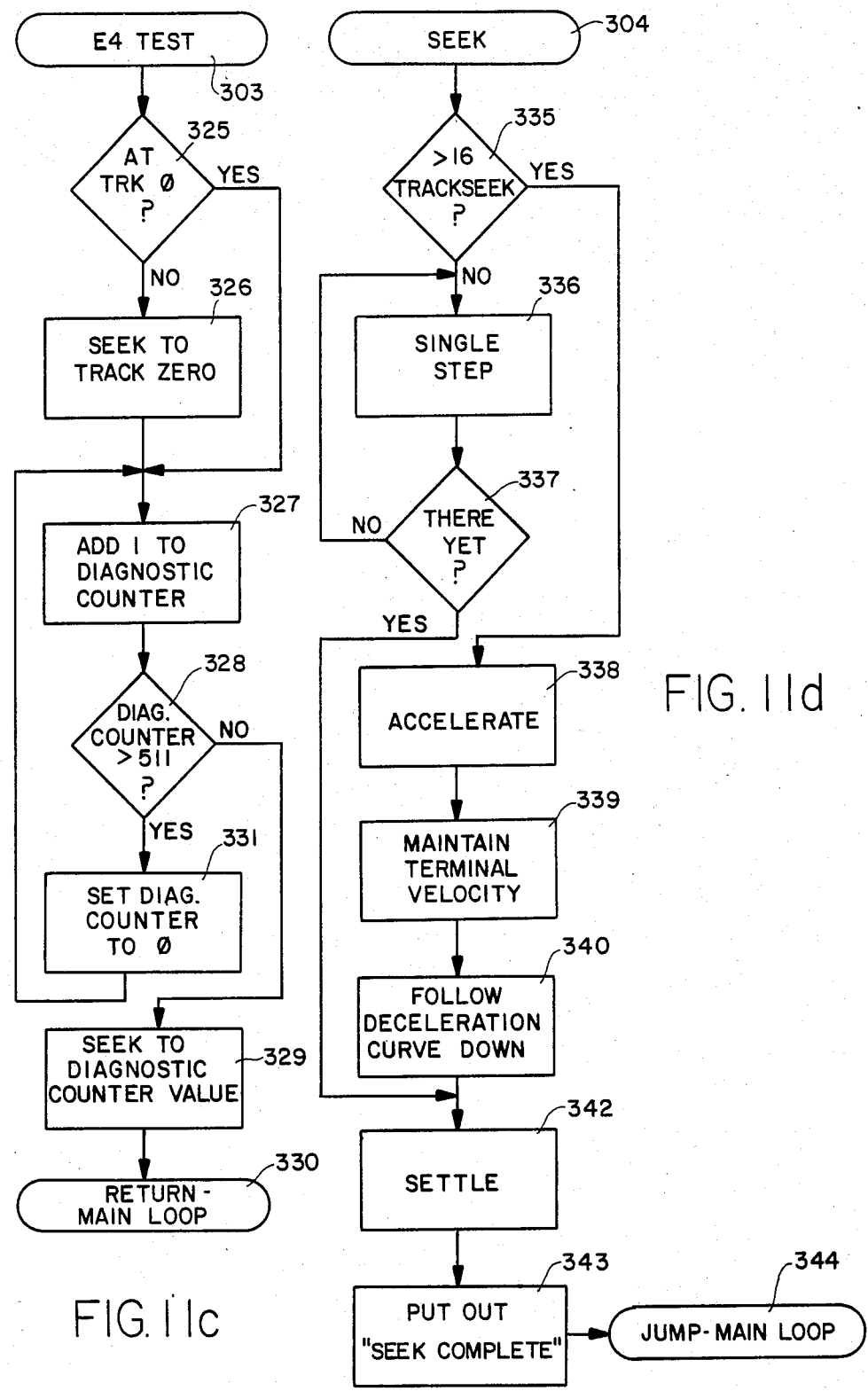

Referring now to FIG. 11a, initialization and calibration of the processor 121 within the environment of the system 20 occurs in the Reset routine 301. All of the internal registers of the 6805R2 microprocessor 121 are cleared to zero and power is removed from the actuator driver circuit 127 at a step 302. A four second delay occurs at a step 303. This delay enables the bias spring to return the carriage assembly 28 to the inner crash stop 66, so that the transducers 63 are at a known starting position inside the outermost track, track zero.

The two phase signals P1 and P2 from the optical encoder 70 are electronically processed by the processor 121 to generate four quadrature phase signals (see FIG. 10, discussed below). Each signal represents a track. In the Reset routine 301 the processor 121 must orient itself to the proper phase. Thus, the processor 121 commands the actuator 27 to move in a known direction, and the P1 and P2 signals are monitored. Once phase zero, the desired phase, is reached, the processor locks onto that phase at a step 304. Phase zero will always be reached within four tracks, as the four phases of the track servo system repeat each other sequentially.

The processor 121 then calculates and stores a no-power compensation value for the actuator driver 127 at a step 305. Ideally, the actuator driver 127 passes no current through the rotor coils 41 or 42 when a selected transducer 63 is located at the centerline of a selected track. (It should be understood that actual track center may not be the indicated center put out by the optical encoder phase signal (P1 or P2) and the servo bursts A and B are used by the processor 121 to adjust digitally the transducer position to reach true track center.) In practice, the carriage bias spring and slight electrical imbalances require a correction value to be calculated and provided to the actuator driver 127.

The processor 121 digitally controls the amplitude of the LED source 82 in the optical encoder 70. The processor commands the driving current put out by the LED driver 128. By controlling the LED amplitude the processor 121 digitally compensates for differences in light sensitivities of the diodes P1 and P2 of the array 93 without any need for electrical trimming, which was required by prior art quadrature encoders. In order to provide compensation to eliminate differences between the two cells, the LED output must be separately set for each diode cell P1 and P2. The processor 121 calculates compensation values for the P1 and P2 diodes and sets a reference value for LED nominal output at an encoder calibration step 306.

Referring to FIG. 10, when the digital word sent to the LED DAC 261 is increased, the LED 82 puts out more light which results in a decrease in voltage level at the photo detector cells P1 and P2 and a smaller analog to digital value converted and read within the processor 121. Thus, the "positive" peaks of the P1 and P2 waveforms depicted in FIG. 10 actually represent minimum light levels, and the "negative" peaks represent maximum light levels. An increasing light level drives each photo diode toward ground potential. The automatic gain control system does not attempt to control the peak absolute voltage values but it does calibrate the two negative peaks which represent maximum light level. The relative amplitude of the TRK 0 cell is also depicted in FIG. 10.

The processor 121 directly commands the current flowing in the actuator 27 to servo on a selected phase 0, 1, 2 or 3 on an approximately linear portion of the selected phase signal in real time. The servo burst peaks A and B read from the single servo sector once each revolution of the disk 26 are used by the processor to calculate correction values which keep the actuator servoed near the center of the selected phase signal at the same time that the actuator has placed the transducer into track centerline alignment. In the improved digital servo system there is no need to generate additional phase shifted control signals as was required in the present applicants' assignee's prior U.S. patent application Ser. No. 06/304,209 now U.S. Pat. No. 4,419,701.

The processor 121 digitally calibrates the encoder 70 as follows: While servoing on one signal, e.g. P2, (which is ideally midway between the positive and negative peak in the most linear portion of the signal) the processor 121 detects the negative peak value of the other phase signal, e.g. P1. In practice the processor 121 commands the rotary actuator 27 to microstep the transducer across a track until the P1 peak is reached and no longer increases in amplitude. The P1 peak is digitized in the processor 121 and compared with a preset nominal LED peak value. If the actually read peak amplitude for P1 is not equal to the nominal peak value, the LED current is changed in the direction likely to render the P1 amplitude equal to the nominal value. The processor 121 then commands a second microstep movement of the actuator 27 through the peak (window fully open) P1 position and re-reads the amplitude of P1. This procedure is repeated until a correction value is determined which renders the P1 amplitude equal to the nominal value. The process step 306 is then repeated for the P2 amplitude. The correction values for P1 and P2 are stored in internal memory locations of the processor 121 and are called whenever P1 or P2 is selected during system operation.

Track zero negative peak amplitude is also read and stored at the calibration step 306. As the temperature within the drive 20 increases, experience has shown that light levels of the LED 82 diminish. Thus, the track zero diode TRK 0 digitized amplitude is stored in the calibration step 306 as a nominal reference value. During drive operation, the processor 121 periodically compares the actual amplitude of the TRK 0 diode with the reference value. If drift occurs, then the processor 121 recalculates the prestored compensation values for P1 and P2 in accordance with any measured drift in light level.

The processor 121 then commands the actuator 27 to move to track zero (the outermost track) at a step 307. At track zero, the TRK 0 diode goes to a maximum voltage (minimum current) condition, as shown in FIG. 10. When track zero is reached, the processor 121 identifies the phase zero servo signal from the encoder 70 by identifying the phase signal which has a negative slope on the trailing phase (P1) as the actuator moves out toward track zero. Track zero will always be a phase zero, and the phase zero is always identified as one of the four phases which occur during the the transition of the TRK 0 diode from window open to window closed (shown on the right side of the phase waveform in FIG. 10).

This completes the Reset (calibration) routine 301, and the processor 121 then jumps to the main loop 302 at a jump step 308.

Referring now to FIG. 11b, the Main Loop 302 involves periodic status checking and updating of operational values. The diagnostic jumper E4 is checked at a step 312. If the jumper is in place, the internal Test routine 303 (FIG. 11c) is called. It is discussed hereinafter. If the jumper is not connected, the Main Loop advances to a logical node 313 which checks the status of the step pulse flag. If track step pulses have been received from the user interface 124, the processor 121 reads the step pulse counter value at a step 314. The processor then tests whether additional step pulses have arrived from the interface 124 at a logical node 315. If so, the processor returns to the main loop. If not, the program jumps to the Seek routine 304 at a jump step 316.

If the step pulse flag is not set, as tested at the logical node 313, the processor reads either the P1 or the P2 phase value at a step 317. The processor also reads the TRK 0 signal at step 317. The processor 121 then calculates a new position correction value based upon a previously determined desired position calculated from the A and B servo sector peaks at a step 318. The updated position correction value is put out to the actuator driver 127 at a step 319. The Main Loop then returns to the step 312 and repeats the steps thereof. Each pass through the Main Loop 302 (absent interrupts) takes approximately 200 microseconds. Thus, there may be approximately 85 passes through the Main Loop for each revolution of the disk 26.

If the E4 test jumper is installed, the Main Loop 302 branches to the Test Routine 303. The processor 121 tests to see if the internal track counter has a value corresponding to track zero to a logical node 325. If not, a seek to track zero is commanded by the processor at a step 326 which includes a call to the Seek routine 304 to accomplish the seek to track zero.

Once track zero is reached, a diagnostic track counter within the processor 121 is incremented by one at a step 327. Then, the internal diagnostic track counter is tested at a logical node 328. If the transducer has not yet reached a count corresponding to the innermost data track (track 511), the processor commands the actuator 27 to seek to the track number set in the diagnostic counter at a step 329. The step 329 actually calls the Seek routine 304 which steps the transducer inwardly by one track, and then the processor 121 is returned to the Main Loop 302 at a return step 330.

If the diagnostic counter exceeds 511 (i.e. it has reached a count of 512), the diagnostic counter is reset to zero at a step 331 and the program returns to the step 327.

The Seek routine 304 (depicted in FIG. 11d) is called at the step 316 whenever there has been a pass through the Main Loop 302 during which the step pulse flag has been set and no additional stepping pulses have been received. The track step pulse count in the stepping counter is tested at a logical node 335. Unless more than 16 stepping pulses have been received, the processor enters a single track step mode at a node 336. Position is tested at a logical node 337. If the destination track has not yet been reached, the routine returns to the single step node 336 and repeats until the destination track is reached.

If the value stored in the track pulse counter exceeds 16 tracks, as tested at the node 335, a slew mode is commanded for the actuator 27 at an acceleration step 338. Terminal velocity is maintained for a predetermined time period at a step 339, and a deceleration curve, stored in a lookup table is followed by the processor 121 to place the actuator at the selected destination track at a step 340.

Once the destination track is reached, the actuator is permitted to settle or stabilize at a step 342 which monitors track centerline servo information. A "seek complete" is put out to the input/output circuitry 122 and to the user interface 124 at a step 343, and a return to the Main Loop 302 is then made at a jump step 344.

Figures 11E, 11F:
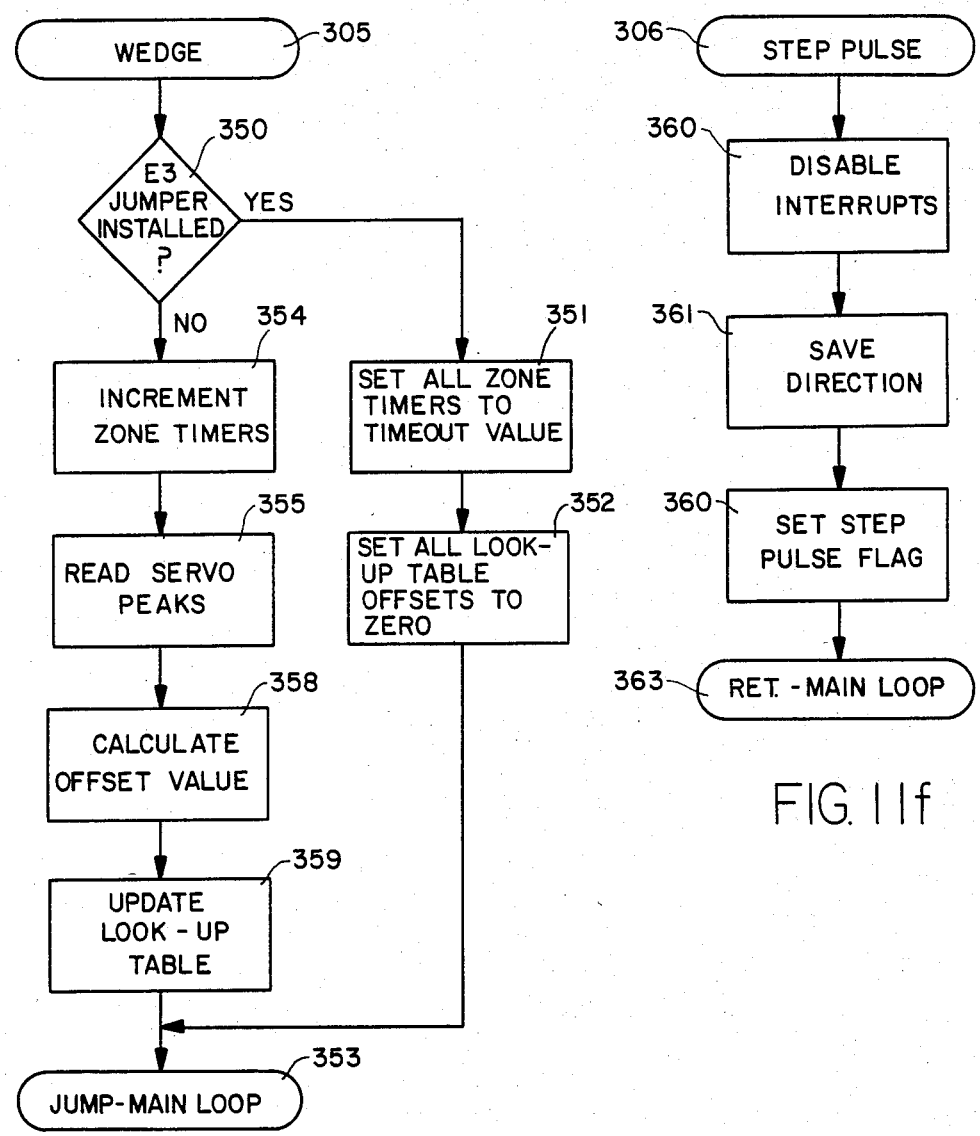

There are two possible interrupt routines called from the Main Loop 302. The first such interrupt routine is the Wedge (servo sector) routine 305 (FIG. 11e). This routine 305 will be bypassed if a test jumper E3 is connected. If the test jumper E3 is connected, as tested at a logical node 350, all zone timers are set to timeout values at a step 351. Also, all lookup table offset values are set to zero at a step 352. The processor 121 is then returned to the Main Loop 302 via a return node 353.

The Wedge routine 305 is called by the Wedge signal from the motor control processor 131 which is put out on the line 141. This routine is thus normally called once per revolution of the disks 26 when the servo sector is reached by the servo transducer 63.

When the E3 Wedge routine bypass jumper is not installed, the zone timers are incremented at a step 354. Operation of the zone timers is explained in the previously referenced U.S. patent application Ser. No. 06/304,209 filed Sept. 21, 1981 now U.S. Pat. No. 4,419,701, reference to which is made for further particulars.

The Wedge routine 305 then causes the processor 121 to read and digitize in succession the peak values of the A and B track centerline servo bursts sent from the read/write circuitry 123 to the processor 121 at a step 355. The A and B servo bursts may be two prerecorded time sequential bursts equally offset radially from centerline of each data track, as taught for example in connection with FIG. 2 of the common assignee's prior U.S. Pat. No. RE 32,075, reference to which is made for further particulars. The processor then calculates new offset values at a step 358 and updates the centerline correction lookup table at a step 359. This correction value is used by the Main Loop 302 at the step 318, and the updated values are put out at the step 319. Once the track centerline correction lookup table has been corrected, the processor 121 jumps to the Main Loop at a step 353.

The other interrupt routine is the Step Pulse routine 306 (FIG. 11f). This routine 306 will be called at the leading edge of the first step pulse received by the processor 121, and it disables any further interrupts thereby enabling the processor 121 to accumulate all of the fast step pulses without being further interrupted by index or any other interrupt signal. Thus, when the Step Pulse routine 306 is called, the first step 360 is to disable all interrupts to the processor 121. The direction of seek (in or out which is a plus or minus sign) is saved at a step 361. The step pulse flag is set at a step 362, and then the processor is returned to the Main Loop 302 at a return step 363. This completes the description of the software architecture of the actuator processor 121.

Input/Output Circuitry 122

(FIG. 12)

A DC power and power on reset (POR) circuit 401 provides regulated voltages to the system 20 and a POR signal to the motor processor 120. A terminating resistor array 402 terminates the lines from the user interface 124. Suitable input buffer circuitry 403 is connected to the incoming lines and the resistor array 402. Signals from the input buffers 403 circulate throughout the system 20. An activity light 404 may be provided should it be desired by the user. It operates in accordance with the drive select signal.

Output control signal buffers 405 and input/output data buffers 406 provide required isolation to control signals and data between the user interface 124 and the system 20.

Read/Write Circuitry 123

(FIG. 13)

The read/write circuitry 123 includes a write enable circuit 411 which receives the wedge signal via the line 141, the up to speed signal via the line 142, the drive select signal via the line 139, a write gate signal from the interface via a line 412, a seek complete signal via a line 413 from the actuator controller 121 and a ready signal from the actuator controller via a line 414.

The circuit 411 puts out a write enable signal via the line 137 to a write driver circuit 416. The write driver circuit receives a power on reset signal from the circuit 401, write data from the data buffers 406, and the reduce write current control signal from the actuator controller 121 via the line 281. The write driver 416 puts out a write current logical signal via the line 138 and puts out data to be written onto two read/write lines 417 and 418 to a head select circuit 419.

The head select circuit 419 receives data transducer selection data from the input buffers 403 and selects one of the eight data transducers 63a–63h.

Data is read from the disks 26 by a transducer 63 selected by the head select circuit 419. Read data passes on the lines 417 and 418 to a read amplifier and filter 420. The data is subjected to further conditioning in a differentiator and comparator circuit 421 and is then passed through a conditioning circuit 422 and then to the data buffers 406. A servo burst amplifier 423 recovers the servo bursts A and B and sends them on to the peak detector circuit 230 connected to the actuator controller 121 via a line 424.

Having thus described a presently preferred embodiment of the present invention, it will now be appreciated that the objects of the invention have been fully achieved, and it will be understood by those skilled in the art that many changes in construction and circuitry and widely differing embodiments and applications of the invention will suggest themselves without departure from the spirit and scope of the invention. The disclosures and the description herein are purely illustrative and are not intended to be in any sense limiting.

We claim:

1. In a rotating disk data storage device including a brushless direct current motor having plural non-rotating field coils and including internal non-contacting commutation sensors, at least one data storage disk rotated by said motor, a data transducer for reading and writing data from and to data tracks on a storage surface of said disk, a transducer carriage for supporting said transducer, a power actuator for moving said carriage to position said transducer among selected data tracks, the improvement comprising:

driver circuit means connected for switching drive current among said coils and for varying said drive current, programmed digital processor means connected to said commutation sensors and to said driver circuit means for calculating switching commands in accordance with data provided by said commutation sensors and for putting out said switching commands to said driver circuit means for switching said drive current, said processor means further connected for monitoring motor speed and for calculating speed correction values and putting them out to said circuit means for adjusting said drive current to maintain motor speed at a constant nominal value.

2. The improved rotating disk data storage device set forth in claim 1 wherein said driver means comprises a plurality of electronic switches with each being connected to a said coil, a common voltage reference node, transconductance amplifier means having two opposed polarity inputs, with one input connected to said reference node and an output connected to adjust current passed by said electronic switches, and further comprising a digital to analog converter connected from said processor means to the other input of said transconductance amplifier so that the operation thereof is responsive to said processor means as well as the voltage at said reference node.

3. In a rotating disk data storage device connectable to a disk drive controller of a host computing system via an interface, wherein the device includes a base; at least one data storage disk mounted for rotation with respect to said base and having a plurality of concentric data tracks on a storage surface thereof and a single servo sector located in a gap between the end and the beginning of each user data track location containing prerecorded track centering information; and at least one data transducer moveable relative to each selected data track during track seeking in response to track selection information supplied by the controller and associated with read/write circuitry for reading and writing user data from and to said data tracks and for reading said prerecorded track centering information during track following operations, the improvement comprising:

a positionable transducer subsystem including:
   a moveable transducer carriage for supporting said transducer in moveable radial relation to the storage surface,
   an electromechanical actuator structure for moving the transducer from track to track during track seeking operations and including electrical means for stabilizing the transducer within the boundaries of a selected data track during track following operations, and
   transducer position digital controller means programmed and connected to receive track selection information from said interface and to put out digital track selection values to the electromechanical actuator structure during track seeking operations, and programmed and connected to receive track centering information read by said data transducer and to put out track centerline correcting values to the electromechanical actuator structure in order to maintain the transducer in centerline alignment with the data track being followed as an interrupt subroutine to all other of its control program activities during track following operations; and a spindle motor subsystem including:
   a plural phase brushless direct current spindle motor mounted to the base, having a rotating spindle on which the data storage disk is directly mounted for rotation, and having a plurality of stationary coils and a plurality of noncontacting commutation sensors;
   an electronic motor driver power switching circuit connected to drive said coils thereby to cause the spindle to rotate;
   spindle motor speed controller means for precisely controlling spindle motor angular velocity and being connected to respond to said commutation sensors and to drive said electronic motor driver power switching circuit, said motor speed control means including a crystal controlled spindle speed reference and means for determining and correcting spindle angular velocity to the crystal controlled reference at least once for each rotation of the storage disk,
   a moving index marker on the spindle for marking the location of beginning of the spindle servo sector prerecorded on the disk surface,
   raw index detector means fixed relative to the base for detecting proximity of the moving index marker and for generating an electrical raw index signal for marking the time and spatial location of the single servo sector as the data storage disk rotates,
   wherein during track following operations of the device, the operation of the spindle motor subsystem causes program execution of the transducer position digital controller means to be interrupted in response to the raw index signal so that it may thereupon call and execute its subroutine for processing said centerline correction information in order to cause the transducer to follow the centerline of the data track being followed, whereby the spindle motor subsystem interacts with and supervises operations of the transducer position subsystem during track following operations.

4. The data storage device set forth in claim 3 wherein said spindle motor speed controller means generates a servo sector wedge protect signal for interrupting said transducer position controller means, the wedge protect signal having a duration corresponding to the interval that the transducer is passing over the servo sector, for inhibiting the read/write circuitry of the device from writing data during the duration of the signal, thereby protecting the prerecorded track centerline correction information in the single servo sector against being overwritten.

5. The data storage device set forth in claim 4 wherein said spindle motor controller means generates a user index signal for the disk drive controller via the interface upon completion of the servo sector wedge protect signal, thereby to signal to the disk drive controller the beginning of the user data track.

6. The data storage device set forth in claim 3 wherein said electromechanical actuator structure includes a voice coil actuator; wherein the transducer is stabilized within the boundaries of a data track being followed in response to at least one optically derived track boundary signal; and, wherein the transducer position controller means includes:
   polyphase position encoder means responsive to position of said transducer carriage means relative to said base, for providing a plurality of analog output track boundary signals phase shifted relative to each other, the amplitude of each output signal being related to said relative positions of said transducer carriage means and said base, wherein said position encoder means comprises optical encoder means including a housing, light source means mounted to said housing for emitting energy photons, a photodetector array comprising at least two photodetectors formed on a common substrate and mounted to said housing and aligned to receive and convert said energy photons from said light source means to analog electrical output signals, a translucent scale having equally spaced apart opaque regions moveable between said light source and said photodetector array, said photodetectors providing said output signals phase shifted relative to each other, said housing and said scale moving relatively to each other as said carriage means moves relative to said base, analog to digital converter means selectively connectable to the position encoder means for converting said phase shifted output signals into digital values, wherein said digital controller includes a digital processor connected to said analog to digital converter means and to the interface, digital to analog converter means connected to said digital processor for converting track following values to actuator analog control values, said actuator driver means being connected to said digital to analog converter means for generating current values from the analog control values and for applying the current values to the voice coil actuator, said digital processor being programmed and connected for providing a digital track region servo signal from a selected one of said digital values of said output signals from said encoder means, and for digitally summing said digital servo signal and said track centerline offset correction values to generate a digital track following value put out through said digital to analog converter to said actuator driver means.

7. The data storage device set forth in claim 3 wherein said spindle motor controller means comprises a programmed digital microprocessor having a crystal controlled clock operating asynchronously with respect to the position control processor, a transconductance amplifier means having two opposed polarity inputs, with one input connected to a common voltage reference node and an output connected to adjust current passed by said switching circuit, and further comprising a spindle motor digital to analog converter connected from said microprocessor to the other input of said transconductance amplifier so that the operation thereof is responsive to said microprocessor as well as to the voltage at said reference node.

8. The data storage device set forth in claim 7 wherein said microprocessor executes a program interrupt subroutine upon detection of raw index in order to correct spindle speed by measuring the time between successive raw index signals, by comparing measured time with a nominal correct time and by generating and applying an error signal to said spindle motor digital to analog converter to correct any calculated difference.

9. The data storage device set forth in claim 7 wherein said microprocessor is programmed to to generate an error signal for each rotation and thereupon to correct spindle motor angular velocity by calculating:

$$Y(k) = Nmu(k-1) - mu(k) + y(k-1)$$

wherein $Y(k)$ is the digital motor speed correction value put out to the digital to analog converter within the second programmed digital computer means, N is a fractional value less than unity, $mu(k-1)$ is the error signal from the previous calcualation, $mu(k)$ is the present error signal, and $y(k-1)$ is the digital motor speed correction value put out at the conclusion of the previous calculation.

10. The data storage device set forth in claim 9 wherein the motor speed digital controller includes an eight bit microprocessor element and wherein N is a fractional value equivalent of 255 divided by 256.

* * * * *